US 9,114,699 B2

(12) United States Patent
Takei et al.

(10) Patent No.: US 9,114,699 B2
(45) Date of Patent: Aug. 25, 2015

(54) HYBRID DRIVE APPARATUS

(75) Inventors: Yasuhito Takei, Wako (JP); Yoshikazu Tanaka, Wako (JP); Toshiharu Kumagai, Wako (JP); Ken Hayasaka, Wako (JP); Masahiro Yoshizawa, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 45 days.

(21) Appl. No.: 13/883,495

(22) PCT Filed: Nov. 7, 2011

(86) PCT No.: PCT/JP2011/075582
§ 371 (c)(1),
(2), (4) Date: Jun. 11, 2013

(87) PCT Pub. No.: WO2012/073651
PCT Pub. Date: Jun. 7, 2012

(65) Prior Publication Data
US 2013/0260936 A1     Oct. 3, 2013

(30) Foreign Application Priority Data

Dec. 3, 2010   (JP) ................................ 2010-270594
Dec. 13, 2010  (JP) ................................ 2010-276735

(51) Int. Cl.
*F16H 37/06* (2006.01)
*B60K 6/50* (2007.10)
(Continued)

(52) U.S. Cl.
CPC . *B60K 6/50* (2013.01); *B60K 6/365* (2013.01); *B60K 6/387* (2013.01); *B60K 6/445* (2013.01);
(Continued)

(58) Field of Classification Search
USPC ......... 475/5, 154, 331, 153, 207, 8, 317, 323, 475/221; 477/5; 180/65.21
See application file for complete search history.

(56) References Cited

U.S. PATENT DOCUMENTS 7,238,133 B2 * 7/2007 Tabata et al. ...................... 475/5
7,387,585 B2 * 6/2008 Bucknor et al. .................. 475/5
(Continued)

FOREIGN PATENT DOCUMENTS

CN    101233032 A    7/2008
JP    2001-030774 A  2/2001
(Continued)

OTHER PUBLICATIONS

International Search Report of PCT/JP2011/075582, mailing date of Jan. 10, 2012.
Office Action dated Feb. 15, 2015, issued in corresponding Chinese Application No. 201180055493.3. (5 pages).

*Primary Examiner* — David J Hlavka
(74) *Attorney, Agent, or Firm* — Westerman, Hattori, Daniels & Adrian, LLP

(57) ABSTRACT

In a hybrid drive apparatus, a first planetary gear mechanism transmits rotation of a first main shaft to which the engine driving force is inputted to a main speed-changing part at an equal speed due to engagement of a first clutch, and transmits the rotation of the first main shaft to the main speed-changing part and a first motor/generator at an increased speed due to engagement of a second clutch. This enables the range of gear ratios of the transmission to be extended and the degree of freedom in setting a gear ratio or a step ratio to be increased, and enhances the power generation efficiency by rotating the first motor/generator at a high speed without using a special speed increase device.

5 Claims, 20 Drawing Sheets

(51) Int. Cl.
*B60K 6/365* (2007.10)
*B60K 6/445* (2007.10)
*B60K 6/547* (2007.10)
*F16H 3/72* (2006.01)
*B60K 6/387* (2007.10)
*B60K 6/48* (2007.10)
*F16H 37/08* (2006.01)
*F16H 37/10* (2006.01)

(52) U.S. Cl.
CPC . *B60K 6/48* (2013.01); *B60K 6/547* (2013.01); *F16H 3/728* (2013.01); *F16H 2037/0886* (2013.01); *F16H 2037/101* (2013.01); *F16H 2200/0043* (2013.01); *F16H 2200/0047* (2013.01); *F16H 2200/0052* (2013.01); *F16H 2200/2005* (2013.01); *F16H 2200/2007* (2013.01); *F16H 2200/2041* (2013.01); *F16H 2200/2043* (2013.01); *F16H 2200/2097* (2013.01); *Y02T 10/6221* (2013.01); *Y02T 10/6239* (2013.01); *Y10S 903/902* (2013.01)

(56) References Cited

U.S. PATENT DOCUMENTS

| | | | |
|---|---|---|---|
| 7,469,758 | B2 | 12/2008 | Iwanaka et al. |
| 7,559,864 | B2 * | 7/2009 | Maeda et al. ............... 475/5 |
| 7,591,750 | B2 * | 9/2009 | Bucknor et al. ............ 475/5 |
| 7,822,524 | B2 * | 10/2010 | Tabata et al. .............. 701/53 |
| 7,988,579 | B2 * | 8/2011 | Tabata et al. ............... 475/5 |
| 2003/0166429 | A1 * | 9/2003 | Tumback .................... 475/5 |
| 2010/0216584 | A1 * | 8/2010 | Lutoslawski ................ 475/5 |
| 2011/0256974 | A1 * | 10/2011 | Okuwaki ..................... 475/5 |
| 2012/0028747 | A1 * | 2/2012 | Imamura et al. ............ 475/5 |

FOREIGN PATENT DOCUMENTS

| | | |
|---|---|---|
| JP | 3815430 B2 | 8/2006 |
| JP | 2009-107388 A | 5/2009 |
| JP | 2009-184433 A | 8/2009 |
| JP | 2010-076679 A | 4/2010 |
| JP | 2010-513107 A | 4/2010 |
| WO | 2009/011328 A1 | 1/2009 |

* cited by examiner

FIG.8

|      | C1 | C2 | C3  | C4 | B1  |
|------|----|----|-----|----|-----|
| Low  | ◯  |    |     |    | ◯   |
| 2nd  |    | ◯  |     |    | ◯   |
| 3rd  |    |    | (◯) | ◯  | (◯) |
| 4th  | ◯  |    | ◯   |    |     |
| 5th  |    | ◯  | ◯   |    |     |

FIG.15

|      | C1 | C2 | C3 | B1 |
|------|----|----|----|----|
| Low  | ○  |    |    | ○  |
| 2nd  | ○  |    | ○  |    |
| 3rd  | ○  | ○  |    |    |
| 4th  |    | ○  | ○  |    |

FIG.20

|       | C1 | C2 | C3 | C4 | B1 |
|-------|----|----|----|----|----|
| Low   | ○  |    |    |    | ○  |
| (2nd) |    |    | ○  | ○  |    |
| 3rd   | ○  |    |    | ○  |    |
| 4th   | ○  |    | ○  |    |    |
| 5th   | ○  | ○  |    |    |    |
| 6th   |    | ○  | ○  |    |    |

HYBRID DRIVE APPARATUS

TECHNICAL FIELD

The present invention relates to a hybrid drive apparatus that includes an engine, a first motor/generator and a transmission.

BACKGROUND ART

A hybrid vehicle in which a motor/generator is disposed between a crankshaft of an engine and an input shaft of a transmission, rotation of the crankshaft of the engine being increased in speed by means of a planetary gear mechanism and transmitted to the motor/generator and the input shaft of the transmission, is known from Patent Document 1 below.

Furthermore, a hybrid vehicle in which a crankshaft of an engine is connected to a carrier of a planetary gear mechanism, a motor/generator for power generation is connected to a sun gear, and a driven wheel and a motor/generator for traction are connected to a ring gear is known from Patent Document 2 below.

RELATED ART DOCUMENTS

Patent Document

Patent Document 1: Japanese Patent No. 3815430
Patent Document 2: International Patent Application Laid-open No. WO2009/011328A1

DISCLOSURE OF INVENTION

Problems to be Solved by the Invention

In the above-mentioned conventional arrangement, since rotation of the crankshaft of the engine is increased in speed by means of the planetary gear mechanism and transmitted to the motor/generator, when the motor/generator is made to function as a power generator, the rotation is increased and power generation can be carried out with high efficiency and, moreover, when the motor/generator is made to function as a motor to start the engine, the torque of the motor/generator is increased by means of the planetary gear mechanism to thus enable reliable cranking to be carried out.

However, in the above-mentioned conventional arrangement, since rotation of the crankshaft of the engine is increased in speed by the planetary gear mechanism and transmitted to the transmission, in order to ensure that there is a sufficiently large gear ratio for a low gear position, it is necessary for the rotational speed that has been increased once by means of the planetary gear mechanism to be reduced again by means of the transmission, and the reduction ratio required for the transmission becomes large, thus giving the problems that the transmission has large dimensions, the degree of freedom in setting a gear ratio is reduced, and the transmission efficiency is degraded due to an increase in frictional loss.

Furthermore, when the motor/generator is made to function as a power generator, the higher the rotation, the better the efficiency of power generation. The invention described in Patent Document 2 above enables rotation of the crankshaft of the engine to be increased in speed by means of the planetary gear mechanism to thus drive the motor/generator for power generation, and power generation can be carried out with high efficiency.

However, in the invention described in Patent Document 2 above, another shaft is newly provided just so that the motor/generator for traction can be disposed for speed reduction; not only are there concerns regarding an increase in the number of components and the cost, but there is also the problem that the number of gears meshing increases due to the motor/generator for traction being disposed on the other shaft, thus degrading the transmission efficiency and, moreover, there is no function of increasing the output rotational speed of the engine due to the motor/generator for fraction being disposed on the other shaft.

The present invention has been accomplished in light of the above-mentioned circumstances, and it is an object thereof to achieve a balance between ensuring an appropriate gear ratio for a transmission and achieving overdrive of a motor/generator in a hybrid drive apparatus.

Means for Solving the Problems

In order to attain the above object, according to a first aspect of the present invention, there is provided a hybrid drive apparatus comprising an engine, a first motor/generator and a transmission, characterized in that the transmission comprises an input shaft, an output shaft disposed in parallel to the input shaft, and an intermediate shaft disposed in a power transmission path from the input shaft to the output shaft, a first power transmission path that is established via a speed-increasing mechanism and a speed-increasing clutch and a second power transmission path that is established via an equal-speed clutch but not via the speed-increasing mechanism being provided between the input shaft and the intermediate shaft, the first motor/generator being disposed on a downstream side of the speed-increasing mechanism, and a main speed-changing part being disposed on a downstream side of the intermediate shaft.

In addition, in the invention with the first aspect, a first main shaft 13 of a first embodiment and a main shaft 13 of second and third embodiments correspond to the input shaft of the present invention, a countershaft 24 of the first embodiment and a countershaft 19 of the second and third embodiments correspond to the output shaft of the present invention, a second main shaft 14 of the first embodiment and a second intermediate shaft 14 of the second and third embodiments correspond to the output shaft of the present invention, a first planetary gear mechanism P1 of the first embodiment and a speed-increasing drive gear 21 and a speed-increasing driven gear 22 of the second and third embodiments correspond to the speed-increasing mechanism of the present invention, a first clutch C1 of the first to third embodiments corresponds to the equal-speed clutch of the present invention, a second clutch C2 of the first to third embodiments corresponds to the speed-increasing clutch of the present invention, and a second planetary gear mechanism P2 of the first embodiment and a planetary gear mechanism P of the second and third embodiments correspond to the main speed-changing part of the present invention.

Further, according to a second aspect of the present invention, there is provided a hybrid drive apparatus comprising an engine, a first motor/generator and a transmission, characterized in that a first planetary gear mechanism is disposed on a first input shaft of the transmission to which a driving force of the engine is inputted, a first element of the first planetary gear mechanism being always connected to the first input shaft, a second element of the first planetary gear mechanism being non-rotatably fixed to a casing, a third element of the first planetary gear mechanism being connected to the first motor/generator, the first planetary gear mechanism being capable of increasing the speed of rotation inputted from the first input shaft to the first element and outputting the rotation to the third element, engagement of the first clutch provided between the first element and a main speed-changing part of the transmission allowing rotation of the first input shaft to be transmitted to the main speed-changing part at an equal speed, and engagement of a second clutch provided between the third element and the main speed-changing part allowing rotation of the first input shaft to be transmitted to the main speed-changing part at an increased speed.

Furthermore, according to a third aspect of the present invention, in addition to the second aspect, the main speed-changing part is formed from a second planetary gear mechanism, a first element of the second planetary gear mechanism is always connected to a second motor/generator and a second input shaft that is relatively rotatably fitted around an outer periphery of the first input shaft, a second element of the second planetary gear mechanism is capable of being connected to the first element via a third clutch and is also capable of being fixed to the casing via a brake, and a third element of the second planetary gear mechanism is connected to an output shaft of the transmission.

Moreover, according to a fourth aspect of the present invention, in addition to the third aspect, the first input shaft and the output shaft are disposed in parallel to each other, a gear fixed to one of the first input shaft and the output shaft meshes with a gear relatively rotatably supported on the other, and the relatively rotatably supported gear is capable of being coupled to the other of the first input shaft and the output shaft via a fourth clutch.

Further, according to a fifth aspect of the present invention, in addition to the third or fourth aspect, the first clutch and the second clutch are disposed at positions that are coaxial with and on an inner peripheral side of the first motor/generator and at which the first and second clutches are superimposed thereon in the axial direction, and the third clutch and the brake are disposed at positions that are coaxial with and on the peripheral side of the second motor/generator and at which the third clutch and the brake are superimposed thereon in the axial direction.

Furthermore, according to a sixth aspect of the present invention, in addition to any one of the third to fifth aspects, the first planetary gear mechanism is disposed at a position that is coaxial with and on the inner peripheral side of the first motor/generator and at which the first planetary gear mechanism is superimposed thereon in the axial direction, and the second planetary gear mechanism is disposed at a position that is coaxial with and on the inner peripheral side of the second motor/generator and at which the second planetary gear mechanism is superimposed thereon in the axial direction.

It should be noted here that in the invention with any one of the second to sixth aspects, a first main shaft 13 and a second main shaft 14 of the first embodiment correspond to the first input shaft and the second input shaft respectively of the present invention, a ring gear 15, a sun gear 16, and a carrier 17 of the first embodiment correspond to the third element, second element, and first element respectively of the first planetary gear mechanism of the present invention, a ring gear 19, a sun gear 20, and a carrier 21 of the first embodiment correspond to the second element, first element, and third element respectively of the second planetary gear mechanism of the present invention, a countershaft 24 of the first embodiment corresponds to the output shaft of the present invention, a main second gear 26 of the first embodiment corresponds to the gear fixed to one of the first input shaft and the output shaft of the present invention, a counter second gear 27 of the first embodiment corresponds to the gear fixed to the other of the first input shaft and the output shaft of the present invention, and a second planetary gear mechanism P2 of the first embodiment corresponds to the main speed-changing part of the present invention.

Further, according to a seventh aspect of the present invention, there is provided a hybrid drive apparatus comprising an engine, a first motor/generator and a transmission, characterized in that the transmission comprises an input shaft, an output shaft disposed in parallel to the input shaft, a first intermediate shaft relatively rotatably fitted around an outer periphery of the output shaft, and a second intermediate shaft relatively rotatably fitted around an outer periphery of the input shaft, a driving force of the engine being inputted into the input shaft, a first gear provided on the input shaft meshing with a second gear provided on the output shaft to thus transmit rotation of the input shaft to the output shaft at an increased speed, a planetary gear mechanism being disposed on an outer periphery of the second intermediate shaft, a first element of the planetary gear mechanism being connected to a third gear provided on the first intermediate shaft, a second element of the planetary gear mechanism being connected to the second intermediate shaft, a third element of the planetary gear mechanism being connected to the output shaft, the input shaft being capable of being coupled to the second intermediate shaft via a first clutch, and the second gear being capable of being coupled to the first intermediate shaft via a second clutch and being capable of rotating integrally with the first motor/generator.

Furthermore, according to an eighth aspect of the present invention, in addition to the seventh aspect, the first element of the planetary gear mechanism is capable of being coupled to the second intermediate shaft via a third clutch and is capable of being coupled to a casing via a brake.

Moreover, according to a ninth aspect of the present invention, in addition to the seventh or eighth aspect, the apparatus comprises a second motor/generator that is capable of rotating integrally with the second intermediate shaft.

Further, according to a tenth aspect of the present invention, in addition to any one of the seventh to ninth aspects, the first motor/generator is disposed on an outer peripheral side of the first intermediate shaft, the second gear is disposed on one side in an axial direction of the first motor/generator, the third gear is disposed on the other side in the axial direction, and the second clutch is disposed at a position that is coaxial with and on an inner peripheral side of the first motor/generator and at which the second clutch is superimposed thereon in the axial direction.

Furthermore, according to an eleventh aspect of the present invention, in addition to the ninth or tenth aspect, the first clutch is disposed at a position that is coaxial with and on an inner peripheral side of the second motor/generator and at which the first clutch is superimposed thereon in the axial direction.

It should be noted here that in the invention with any one of the seventh to eleventh aspects, a main shaft 13 of the second and third embodiments corresponds to the input shaft of the present invention, a sun gear 15, a ring gear 16, and a carrier 17 of the second and third embodiments correspond to the second element, first element, and third element respectively of the planetary gear mechanism of the present invention, a countershaft 19 of the second and third embodiments corresponds to the output shaft of the present invention, a speed-increasing drive gear 21 of the second and third embodiments corresponds to the first gear of the present invention, a speed-increasing driven gear 22 of the second and third embodiments corresponds to the second gear of the present invention, and a speed-increasing output gear 23 and a speed-increasing/speed-decreasing output gear 23' of the second and third embodiments correspond to the third gear of the present invention.

Effects of the Invention

In accordance with the first aspect of the present invention, since the first power transmission path established via the speed-increasing mechanism and the speed-increasing clutch and the second power transmission path established via the equal-speed clutch but not via the speed-increasing mechanism are provided between the input shaft and the intermediate shaft, inputting rotation at an equal speed established via the equal-speed clutch on a low gear ratio side into the main speed-changing part and inputting rotation at an increased speed established via the speed-increasing clutch on a high gear ratio side into the main speed-changing part enables the range of gear ratios of the transmission to be extended and the degree of freedom in setting a gear ratio or a step ratio to be increased. Moreover, since the rotation at the increased speed can be transmitted to the first motor/generator, it is possible to enhance the power generation efficiency by rotating the first motor/generator at a high speed without using special speed increase means. This enables the speed-increasing mechanism to play a role not only in increasing the speed of rotation inputted into the main speed-changing part but also in increasing the speed of rotation inputted into the first motor/generator, and there is no need to separately provide a speed-increasing mechanism for the rotational speed inputted into the first motor/generator, thus enabling the weight and the cost to be cut.

Furthermore, in the case of a transmission that can only input rotation at an increased speed to a main speed-changing part, if an attempt is made to decrease the speed of the increased speed rotation to a required gear ratio, a very large reduction ratio is necessary, and there is a possibility that frictional losses will increase or the transmission will increase in size, but in accordance with the present invention, since it is unnecessary to employ a very large reduction ratio, it becomes possible to reduce frictional losses and reduce the size of the transmission.

Moreover, in accordance with the second aspect of the present invention, since the first element of the first planetary gear mechanism disposed on the first input shaft of the transmission, to which the driving force of the engine is inputted, is always connected to the first input shaft, the second element is non-rotatably fixed to the casing, and the third element is connected to the first motor/generator, the first planetary gear mechanism can increase the speed of the rotation inputted from the first input shaft into the first element and output it from the third element to the first motor/generator. Therefore, it becomes possible to transmit the rotation of the first input shaft to the main speed-changing part of the transmission at an equal speed by engagement of the first clutch provided between the first element and the main speed-changing part, and to transmit the rotation of the first input shaft to the main speed-changing part at an increased speed by engagement of the second clutch provided between the third element and the main speed-changing part; inputting the rotation at equal speed to the main speed-changing part on a low gear ratio side and the inputting rotation at an increased speed to the main speed-changing part on a high gear ratio side enables the range of gear ratios of the transmission to be extended and the degree of freedom in setting a gear ratio and a step ratio to be increased. Moreover, since the rotation at the increased speed can be transmitted to the first motor/generator, it is possible to enhance the power generation efficiency by rotating the first motor/generator at a high speed without using special speed increase means. This enables the first planetary gear mechanism to play a role not only in increasing the speed of rotation inputted into the main speed-changing part but also in increasing the speed of rotation inputted into the first motor/generator, and there is no need to separately provide a speed-increasing mechanism for the speed of rotation inputted into the first motor/generator, thus enabling the weight and the cost to be cut.

Furthermore, in the case of a transmission that can only input rotation at an increased speed to a main speed-changing part, if an attempt is made to decrease the speed of the rotation at an increased speed to a required gear ratio, a very large reduction ratio is necessary, and there is a possibility that frictional losses will increase or the transmission will increase in size, but in accordance with the present invention, since it is unnecessary to employ a very large reduction ratio, it becomes possible to reduce frictional losses and reduce the size of the transmission.

Moreover, in accordance with the third aspect of the present invention, since the first element of the main speed-changing part formed from the second planetary gear mechanism is always connected to the second motor/generator and the second input shaft relatively rotatably fitted around the outer periphery of the first input shaft, the second element can be connected to the first element via the third clutch and can also be fixed to the casing via the brake, and the third element is connected to the output shaft of the transmission, engaging the third clutch and the brake selectively enables a gear ratio outputted by the main speed-changing part to be changed between two gear positions and, moreover, driving the second motor/generator enables travel without using the driving force of the engine or travel while assisting the driving force of the engine.

Furthermore, in accordance with the fourth aspect of the present invention, since the first input shaft and the output shaft are disposed in parallel to each other, the gear fixed to one of the first input shaft and the output shaft meshes with the gear supported relatively rotatably on the other, and the relatively rotatably supported gear can be coupled to the other of the first input shaft and the output shaft via the fourth clutch, engaging the fourth clutch enables a gear position to be established without the first and second planetary gear mechanisms, thus preventing the occurrence of an event in which gear-shift control becomes unstable when carrying out shift change by changing gripping of the brake or the clutch of the first and second planetary gear mechanisms.

Moreover, in accordance with the fifth aspect of the present invention, since the first clutch and the second clutch are disposed at positions that are coaxial with and on the inner peripheral side of the first motor/generator and at which they are superimposed thereon in the axial direction, and the third clutch and the brake are disposed at positions that are coaxial with and on the inner peripheral side of the second motor/generator and at which they are superimposed thereon in the axial direction, it is possible to shorten the length in the axial direction and achieve a small size for the transmission.

Furthermore, in accordance with the sixth aspect of the present invention, since the first planetary gear mechanism is disposed at a position that is coaxial with and on the inner peripheral side of the first motor/generator and at which it is superimposed thereon in the axial direction, and the second planetary gear mechanism is disposed at a position that is coaxial with and on the inner peripheral side of the second motor/generator and at which it is superimposed thereon in the axial direction, it is possible to shorten the length in the axial direction and achieve a small size for the transmission.

Moreover, in accordance with the seventh aspect of the present invention, since rotation of the second gear meshing with the first gear provided on the input shaft, to which the driving force of the engine is inputted, is increased in speed relative to rotation of the input shaft, the power generation efficiency can be enhanced by driving the first motor/generator, which rotates integrally with the second gear, at an increased rotational speed and, moreover, since rotation of the input shaft is increased in speed by the first and second gears and transmitted to the first motor/generator, compared with a case in which it is increased in speed by a planetary gear mechanism and transmitted to a first motor/generator, it is possible to decrease the number of gears meshing and reduce transmission loss.

Furthermore, since the second gear is coupled via the second clutch to the first intermediate shaft relatively rotatably fitted around the outer periphery of the output shaft, the planetary gear mechanism is provided on the outer periphery of the second intermediate shaft relatively rotatably fitted around the outer periphery of the input shaft and coupled via the first clutch, the first element of the planetary gear mechanism is connected to the third gear provided on the first intermediate shaft, the second element of the planetary gear mechanism is connected to the second intermediate shaft, and the third element of the planetary gear mechanism is connected to the output shaft, inputting a rotational speed that has been increased via the first gear, the second gear, the second clutch, the first intermediate shaft, and the third gear and a rotational speed at an equal speed via the first clutch into the planetary gear mechanism enables a plurality of gear positions to be established between the input shaft and the output shaft.

Since the second gear, the second clutch, the first intermediate shaft, and the third gear, which form a speed increase path for speed change, are disposed coaxially with the output shaft, not only is it possible to reduce the size of the transmission, but it is also possible to reduce the cost by utilizing the speed increase path for speed change in order to overdrive the first motor/generator and, moreover, since the second clutch can couple the second gear to the first intermediate shaft, even if the second clutch is disengaged when a speed increase is not required for speed change, the first motor/generator can be rotated at an increased speed, thus enhancing the power generation efficiency.

Furthermore, in accordance with the eighth aspect of the present invention, since the first element of the planetary gear mechanism can be coupled to the second intermediate shaft via the third clutch and can also be coupled to the casing via the brake, selectively engaging the third clutch and the brake enables two gear positions to be established.

Moreover, in accordance with the ninth aspect of the present invention, since the second motor/generator that can be rotated integrally with the second intermediate shaft is provided, it is possible by a simple structure to make a vehicle travel by means of the driving force of the second motor/generator, assist the driving force of the engine by means of the driving force of the second motor/generator, and recover the kinetic energy of the vehicle as electrical energy by regeneratively braking the second motor/generator.

Furthermore, in accordance with the tenth aspect of the present invention, since the second gear and the third gear are disposed in a divided manner on opposite sides in the axial direction of the first motor/generator disposed on the outer periphery of the first intermediate shaft, and the second clutch is disposed at a position that is coaxial with and on the inner peripheral side of the first motor/generator and at which it is superimposed thereon in the axial direction, it is possible to shorten the length of the transmission in the axial direction.

Moreover, in accordance with the eleventh aspect of the present invention, since the first clutch is disposed at a position that is coaxial with and on the inner peripheral side of the second motor/generator and at which it is superimposed thereon in the axial direction, it is possible to shorten the length of the transmission in the axial direction.

BRIEF DESCRIPTION OF DRAWINGS

FIG. 8 is a table of engagement of first to fourth clutches and a brake of the transmission. (first embodiment)

Figure 15:
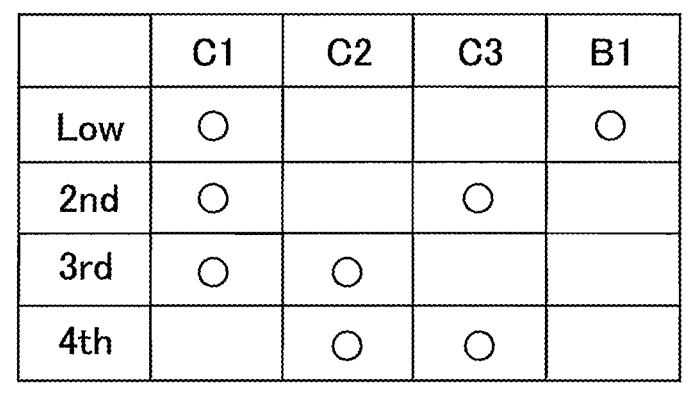

FIG. 15 is a table of engagement of first to third clutches and a brake of the transmission. (second embodiment)

Figure 20:
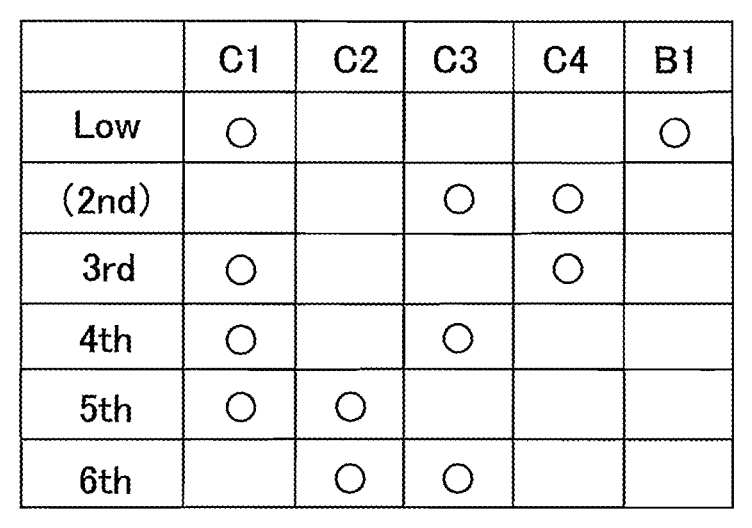

FIG. 20 is a table of engagement of first to fourth clutches and a brake of the transmission. (third embodiment)

EXPLANATION OF REFERENCE NUMERALS AND SYMBOLS

First Embodiment

13 First main shaft (input shaft, first input shaft)
14 Second main shaft (intermediate shaft, second input shaft)
15 Ring gear (third element of first planetary gear mechanism)
16 Sun gear (second element of first planetary gear mechanism)
17 Carrier (first element of first planetary gear mechanism)
19 Ring gear (second element of second planetary gear mechanism)

20 Sun gear (first element of second planetary gear mechanism)
21 Carrier (third element of second planetary gear mechanism)
24 Countershaft (output shaft)
26 Main second gear (gear fixed to one of first input shaft and output shaft)
27 Counter second gear (gear fixed to the other of first input shaft and output shaft)
31 Casing
B1 Brake
C1 First clutch (equal-speed clutch)
C2 Second clutch (speed-increasing clutch)
C3 Third clutch
C4 Fourth clutch
E Engine
P1 First planetary gear mechanism (speed-increasing mechanism)
P2 Second planetary gear mechanism (main speed-changing part)
MG1 First motor/generator
MG2 Second motor/generator
T Transmission Second and Third Embodiments 13 Main shaft (input shaft)
14 Second intermediate shaft (intermediate shaft)
15 Sun gear (second element of planetary gear mechanism)
16 Ring gear (first element of planetary gear mechanism)
17 Carrier (third element of planetary gear mechanism)
19 Countershaft (output shaft)
20 First intermediate shaft
21 Speed-increasing drive gear (speed-increasing mechanism, first gear)
22 Speed-increasing driven gear (speed-increasing mechanism, second gear)
23 Speed-increasing output gear (third gear)
23' Speed-increasing/speed-decreasing output gear (third gear)
30 Casing
B1 Brake
C1 First clutch (equal-speed clutch)
C2 Second clutch (speed-increasing clutch)
C3 Third clutch
E Engine
P Planetary gear mechanism (main speed-changing part)
MG1 First motor/generator
MG2 Second motor/generator
T Transmission

MODES FOR CARRYING OUT THE INVENTION

Modes for carrying out the present invention are explained below by reference to the attached drawings.

First Embodiment

A first embodiment of the present invention is explained below by reference to FIG. 1 to FIG. 8.

Figure 1:
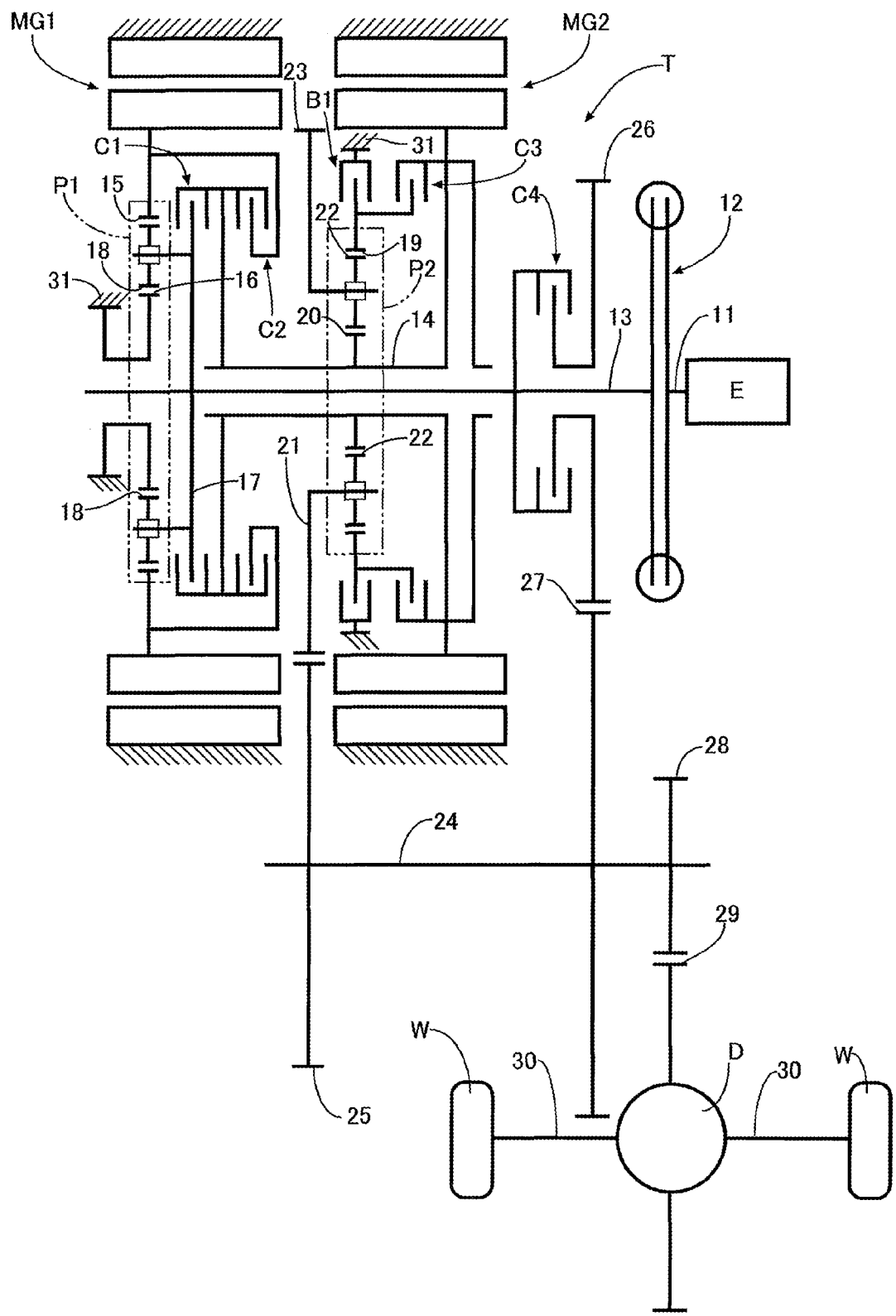
FIG. 1 is a skeleton diagram of a hybrid drive apparatus. (first embodiment)

As shown in FIG. 1, a transmission T of a hybrid vehicle includes a first main shaft 13 that is coaxially connected to a crankshaft 11 of an engine E via a damper 12, and a second main shaft 14 is relatively rotatably fitted around the outer periphery of the first main shaft 13. A first planetary gear mechanism P1 for speed increase that is provided at the shaft end, on the side opposite to the engine E, of the first main shaft 13 includes a ring gear 15 that is connected to a rotor of a first motor/generator MG1, a sun gear 16 that is fixed to a casing 31, a carrier 17 that is fixed to the first main shaft 13, and a plurality of pinions 18 that are rotatably supported on the carrier 17 and simultaneously mesh with the ring gear 15 and the sun gear 16. The second main shaft 14 can be coupled to the carrier 17, that is, the first main shaft 13, via a first clutch C1 and can also be coupled to the ring gear 15, that is, the rotor of the first motor/generator MG1, via a second clutch C2.

A second planetary gear mechanism P2 for speed change provided on the outer periphery of the second main shaft 14 includes a ring gear 19, a sun gear 20 that is fixed to the second main shaft 14, a carrier 21, and a plurality of pinions 22 that are rotatably supported on the carrier 21 and simultaneously mesh with the ring gear 19 and the sun gear 20. The ring gear 19 can be coupled to a rotor of the second motor/generator MG2 and the second main shaft 14 via a third clutch C3 and can also be coupled to the casing 31 via a brake B1.

A main first gear 23 fixed to the carrier 21 of the second planetary gear mechanism P2 meshes with a counter first gear 25 fixed to a countershaft 24. Furthermore, a main second gear 26 that can be coupled to the first main shaft 13 via a fourth clutch C4 meshes with a counter second gear 27 fixed to the countershaft 24. A final drive gear 28 fixed to the countershaft 24 meshes with a final driven gear 29 fixed to a differential gear D, and left and right driven wheels W and W are connected to drive shafts 30 and 30 extending laterally from the differential gear D.

The operation of the first embodiment of the present invention having the above-mentioned arrangement is now explained.

Figure 7:
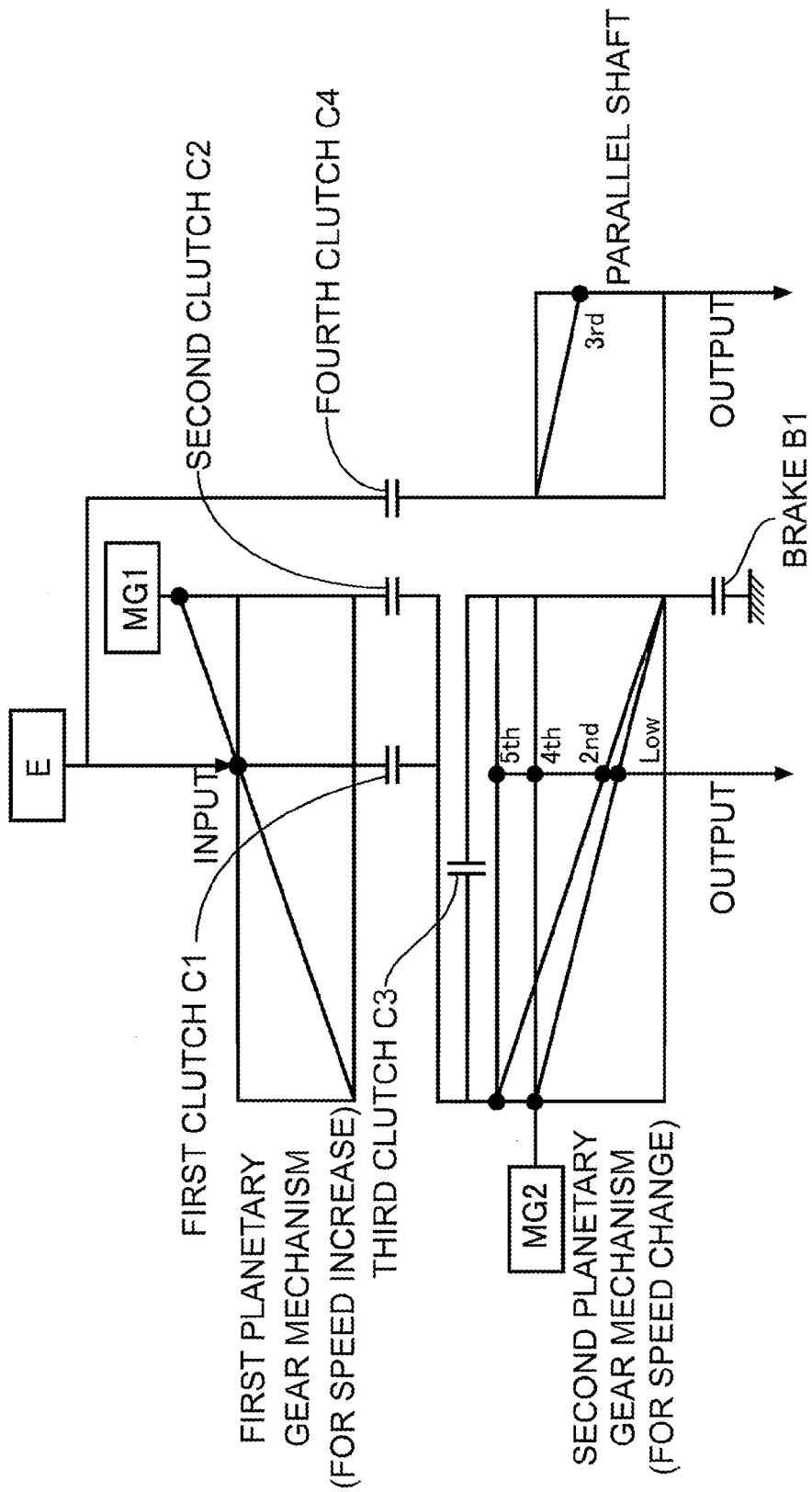
FIG. 7 is a speed diagram of a transmission. (first embodiment)

As is clear from FIG. 1 and FIG. 7, when the first clutch C1 is engaged, since the first main shaft 13 is directly coupled to the second main shaft 14 via the carrier 17 of the first planetary gear mechanism P1, the second main shaft 14 rotates at the same rotational speed as that of the first main shaft 13. When the second clutch C2 is engaged, since the ring gear 15 of the first planetary gear mechanism P1 having the sun gear 16 fixed to the casing 31 is coupled to the second main shaft 14, rotation inputted from the first main shaft 13 to the carrier 17 is increased in speed and outputted to the ring gear 15, and the rotational speed of the second main shaft 14 is increased relative to the rotational speed of the first main shaft 13.

When the brake B1 is engaged, since the ring gear 19 of the second planetary gear mechanism P2 is fixed to the casing 31, rotation inputted from the second main shaft 14 into the sun gear 20 is decreased in speed and outputted to the carrier 21. When the third clutch C3 is engaged, the ring gear 19 is coupled to the sun gear 20 via the second main shaft 14, thus putting the second planetary gear mechanism P2 into a locked state, and rotation of the second main shaft 14 is outputted to the carrier 21 as it is.

Therefore, combining engagement and disengagement of the first to third clutches C1 to C3 and the brake B1 enables rotation of the first main shaft 13 to be changed in speed at various gear ratios and transmitted to the countershaft 24.

The first planetary gear mechanism P1, the first clutch C1, and the second clutch C2, which are housed on the inner peripheral side of the first motor/generator MG1, are disposed so as to be contained within the width in the axial direction of the first motor/generator MG1, and the second planetary gear mechanism P2, the third clutch C3, and the brake B1, which are housed on the inner peripheral side of the second motor/generator MG2, are disposed so as to be contained within the width in the axial direction of the second motor/generator MG2.

The established state of each of first speed to fifth speed gear positions is specifically explained below.

Figure 2:
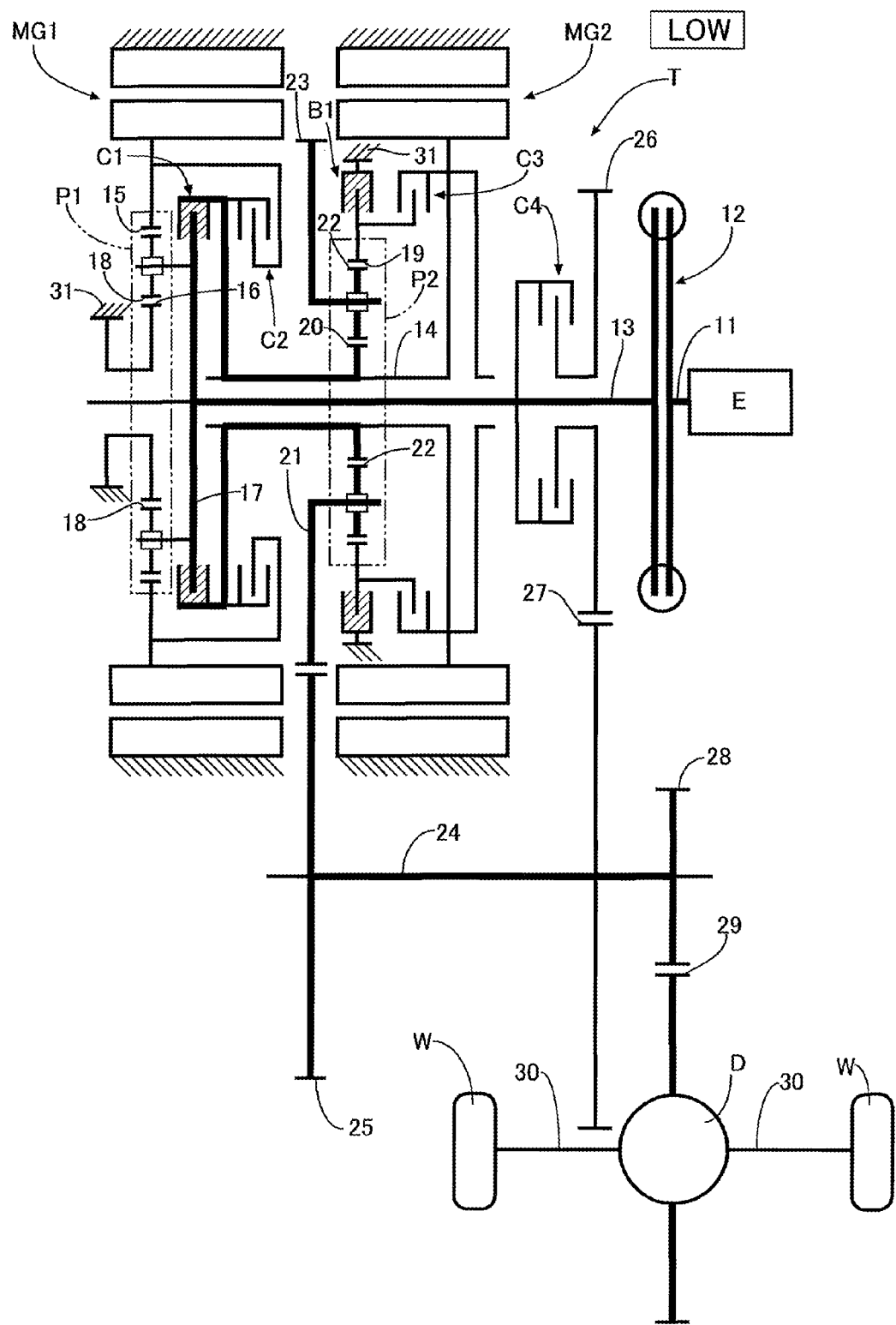
FIG. 2 is a diagram showing a state in which a first speed gear position is established. (first embodiment)

FIG. 2 shows a state in which the first clutch C1 and the brake B1 are engaged and a first speed gear position is established. Rotation of the engine E is transmitted to the driven wheels W and W via the path: crankshaft 11→damper 12→first main shaft 13→carrier 17 of first planetary gear mechanism P1→first clutch C1→second main shaft 14→sun gear 20, pinions 22, and carrier 21 of second planetary gear mechanism P2→main first gear 23→counter first gear 25→countershaft 24→final drive gear 28→final driven gear 29→differential gear D→drive shafts 30 and 30.

In this process, the first planetary gear mechanism P1 does not carry out speed reduction or speed increase, but the second planetary gear mechanism P2 carries out speed reduction, thus establishing the first speed gear position.

Figure 3:
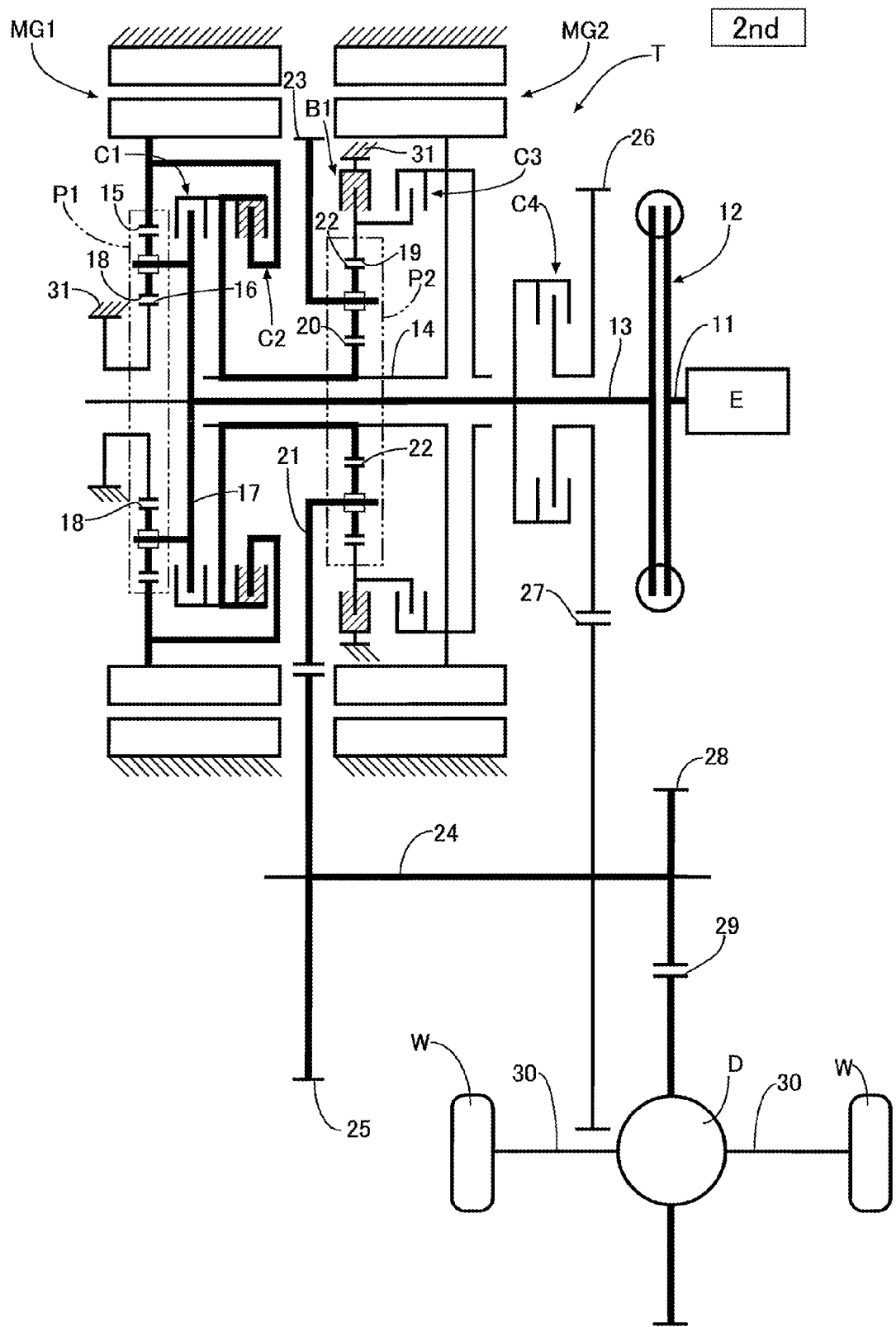
FIG. 3 is a diagram showing a state in which a second speed gear position is established. (first embodiment)

FIG. 3 shows a state in which the second clutch C2 and the brake B1 are engaged and a second speed gear position is established. Rotation of the engine E is transmitted to the driven wheels W and W via the path: crankshaft 11→damper 12→first main shaft 13→carrier 17, pinions 18, and ring gear 15 of first planetary gear mechanism P1→second clutch C2→second main shaft 14→sun gear 20, pinions 22, and carrier 21 of second planetary gear mechanism P2→main first gear 23→counter first gear 25→countershaft 24→final drive gear 28→final driven gear 29→differential gear D→drive shafts 30 and 30.

In this process, the first planetary gear mechanism P1 carries out speed increase, and the second planetary gear mechanism P2 carries out speed reduction, thus establishing the second speed gear position, which has a smaller gear ratio than that of the first speed gear position.

Figure 4:
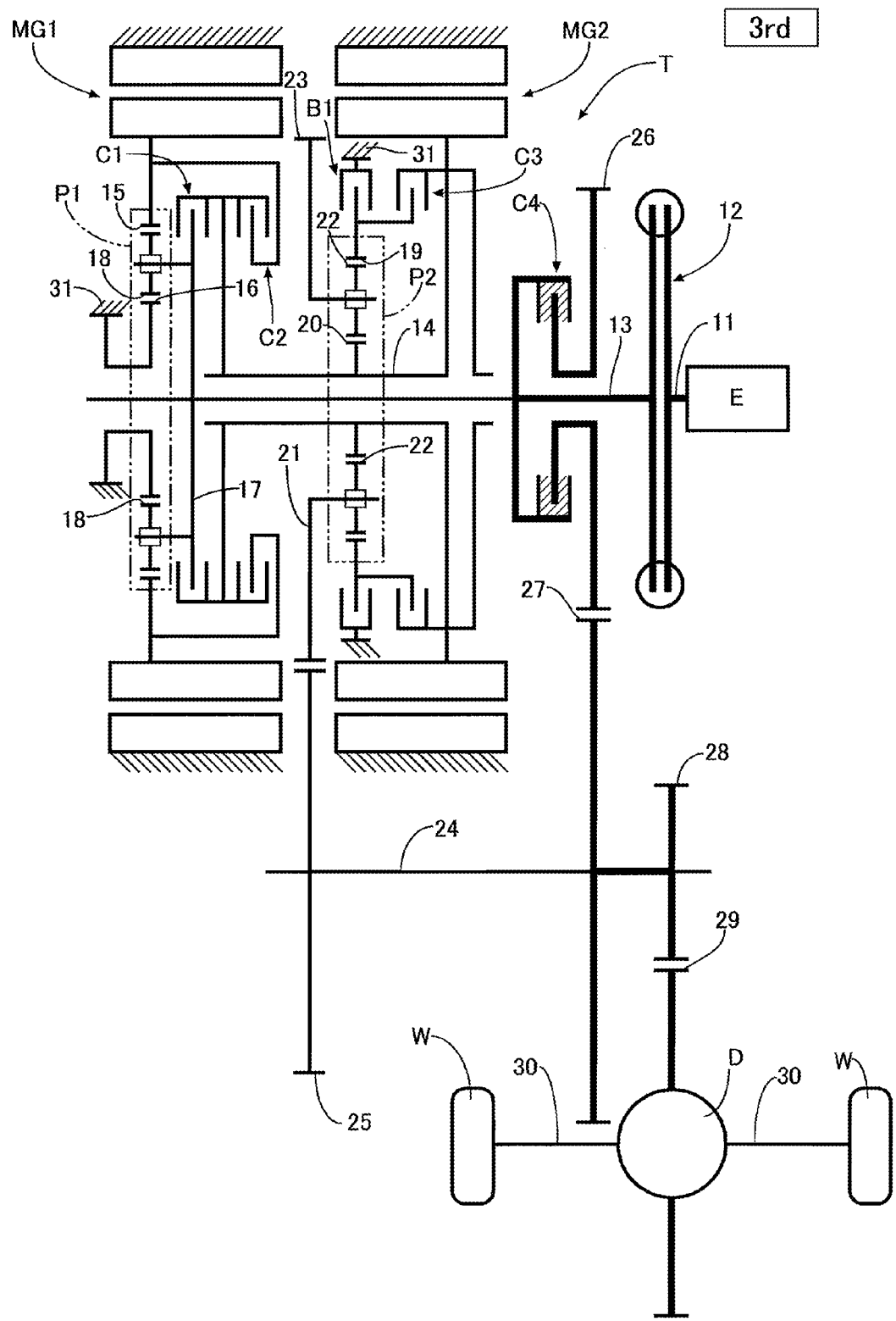
FIG. 4 is a diagram showing a state in which a third speed gear position is established. (first embodiment)

FIG. 4 shows a state in which the fourth clutch C4 is engaged and a third speed gear position is established. Rotation of the engine E is transmitted to the driven wheels W and W via the path: crankshaft 11→damper 12→first main shaft 13→fourth clutch C4→main second gear 26→counter second gear 27→countershaft 24→final drive gear 28→final driven gear 29→differential gear D→drive shafts 30 and 30.

In this process, rotation of the first main shaft 13 is transmitted to the countershaft 24 without going through the first planetary gear mechanism P1 or the second planetary gear mechanism P2, and setting the number of teeth of the main second gear 26 and the counter second gear 27 establishes the third speed gear position, which has a smaller gear ratio than that of the second speed gear position.

Figure 5:
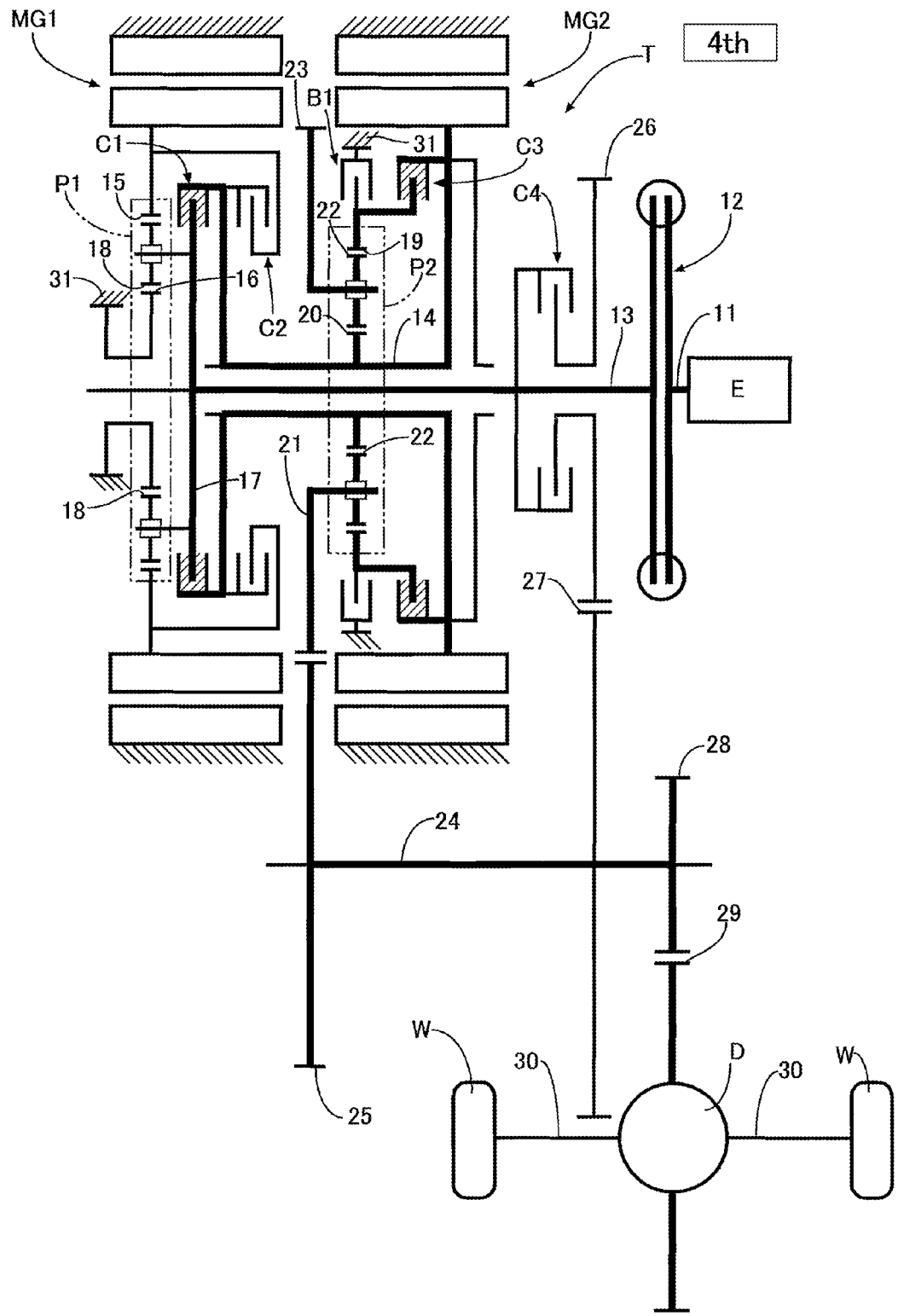
FIG. 5 is a diagram showing a state in which a fourth speed gear position is established. (first embodiment)

FIG. 5 shows a state in which the first clutch C1 and the third clutch C3 are engaged and a fourth speed gear position is established. Rotation of the engine E is transmitted to the driven wheels W and W via the path: crankshaft 11→damper 12→first main shaft 13→carrier 17 of first planetary gear mechanism P1→first clutch C1→second main shaft 14→carrier 21 of second planetary gear mechanism P2 locked by engagement of third clutch C3 21→main first gear 23→counter first gear 25→countershaft 24→final drive gear 28→final driven gear 29→differential gear D→drive shafts 30 and 30.

In this process, the first planetary gear mechanism P1 does not carry out speed reduction or speed increase, and the second planetary gear mechanism P2 does not carry out speed reduction or speed increase either, thus establishing the fourth speed gear position, which has a smaller gear ratio than that of the third speed gear position.

Figure 6:
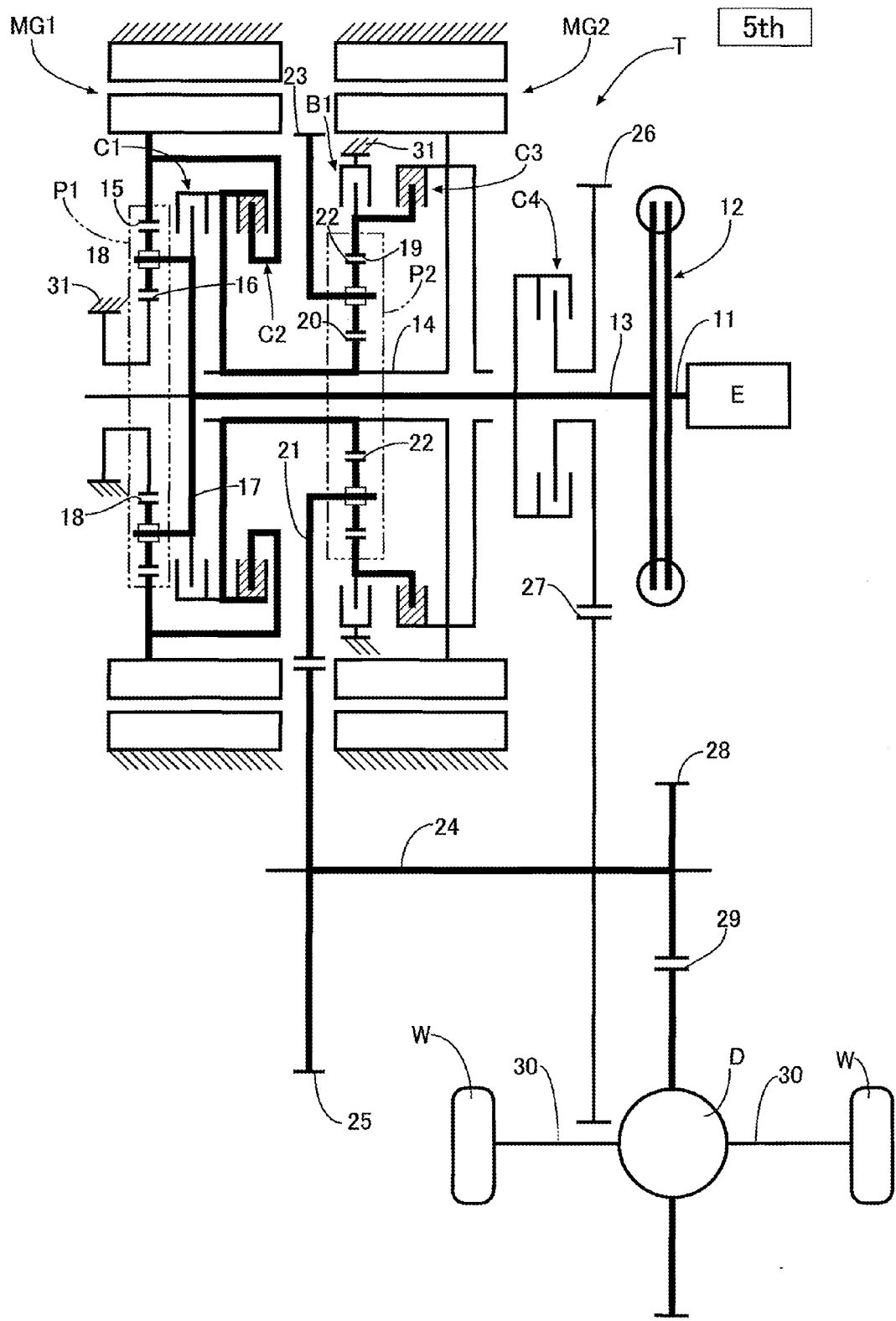
FIG. 6 is a diagram showing a state in which a fifth speed gear position is established. (first embodiment)

FIG. 6 shows a state in which the second clutch C2 and the third clutch C3 are engaged and a fifth speed gear position is established. Rotation of the engine E is transmitted to the driven wheels W and W via the path: crankshaft 11→damper 12→first main shaft 13→carrier 17, pinions 18, and ring gear 15 of first planetary gear mechanism P1→second clutch C2→second main shaft 14→carrier 21 of second planetary gear mechanism P2 locked by engagement of third clutch C3→main first gear 23→counter first gear 25→countershaft 24→final drive gear 28→final driven gear 29→differential gear D→drive shafts 30 and 30.

In this process, the first planetary gear mechanism P1 carries out speed increase, and the second planetary gear mechanism P2 does not carry out speed reduction or speed increase, thus establishing the fifth speed gear position, which has a smaller gear ratio than that of the fourth speed gear position.

Figure 8:
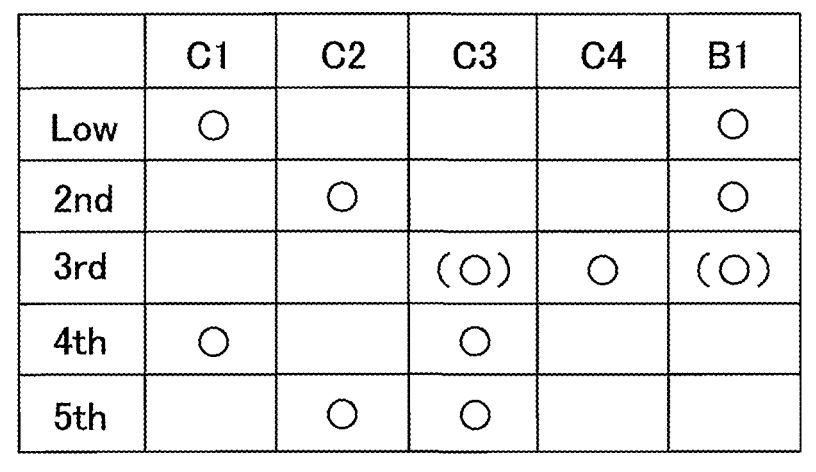

As is clear from FIG. 8, at the second speed gear position the second clutch C2 and the brake B1 are engaged, and at the fourth speed gear position the first clutch C1 and the third clutch C3 are engaged. Assuming a case in which the third speed gear position is not present, and the second speed gear position is changed directly to the fourth speed gear position or the fourth speed gear position is changed directly to the second speed gear position, since it would be necessary to carry out changing of gripping between the first clutch C1 and the second clutch C2 and changing of gripping between the third clutch C3 and the brake B1, only a slight error in the timing of changing of gripping might generate a state in which gear-shift control would be unstable. However, in accordance with the present embodiment, disposing between the second speed gear position and the fourth speed gear position the third speed gear position, which does not require changing of gripping of the first to third clutches C1 to C3 and the brake B1, enables the above-mentioned problems to be eliminated.

(○) in FIG. 8 denotes that establishment of the third speed gear position is not influenced by engagement or disengagement of the third clutch C3 and the brake B1. Therefore, when shifting up from the third speed gear position to the fourth speed gear position, the third clutch C3 is engaged in advance, and in this state the fourth speed gear position is established by engaging the first clutch C1, thus enabling smooth shifting up without controlling the timing of change of gripping with good precision. Similarly, when shifting down from the third speed gear position to the second speed gear position, the brake B1 is engaged in advance, and in this state the second speed gear position is established by engaging the second clutch C2, thus enabling smooth shifting down without controlling the timing of change of gripping with good precision.

The first motor/generator MG1 is rotated by the driving force of the engine E, thus mainly functioning as a generator. While the engine E is running, even if the first clutch C1 is in an engaged state, the second clutch C2 is in an engaged state, or both the first and second clutches C1 and C2 are in a disengaged state, rotation of the first main shaft 13 is increased in speed by the first planetary gear mechanism P1 and transmitted to the first motor/generator MG1, and it is therefore possible to drive the motor/generator MG1 at a high speed, thus enhancing the power generation efficiency.

In this way, since rotation inputted into the first motor/generator MG1 can be increased in speed by utilizing the first planetary gear mechanism P1, which increases the speed of rotation of the first main shaft 13 and transmits it to the second main shaft 14, it is unnecessary to use a special speed-increasing mechanism for increasing the speed of rotation inputted into the first motor/generator MG1, thus contributing to a reduction in the weight and cost.

In addition, making the first motor/generator MG1 function as a motor enables the crankshaft 11 to be cranked by means of the driving force of the first motor/generator MG1, thus starting the engine E. When, in order to start the engine E while the vehicle is traveling, the first motor/generator MG1 is driven in a state in which both the first clutch C1 and the second clutch C2 are disengaged, since its rotation is reduced in speed by the first planetary gear mechanism P1 and transmitted from the first main shaft 13 to the crankshaft 11, the crankshaft 11 can be cranked with a large torque, thus enhancing the ease of starting of the engine E.

Since the second motor/generator MG2, which mainly functions as a motor, is directly coupled to the second main shaft 14, regardless of whether any gear position is established, the vehicle can be made to travel by the driving force of the second motor/generator MG2 or the driving force of the engine E can be assisted by the driving force of the second motor/generator MG2. Furthermore, when the vehicle is reducing in speed, if the second motor/generator MG2 is made to function as a generator by a driving force transmitted back from the driven wheels W and W side, it is possible to recover vehicle kinetic energy as electrical energy.

The operational effect of the first embodiment of the present invention is now explained.

Since, when the first clutch C1 is engaged, the first main shaft 13 is directly coupled to the second main shaft 14, rotation of the first main shaft 13 is transmitted to the second main shaft 14 at the same speed, and when second clutch C2 is engaged, the first planetary gear mechanism P1 increases the speed of rotation of the first main shaft 13 and transmits it to the second main shaft 14, selectively engaging the first and second clutches C1 and C2 enables the range of gear ratios of the transmission T to be extended and the degree of freedom of setting a gear ratio or a step ratio to be increased. Moreover, since rotation of the first main shaft 13 can be increased in speed and transmitted to the first motor/generator MG1, it is possible to enhance the power generation efficiency by rotating the first motor/generator MG1 at a high speed without using special speed increase means. In this way, the first planetary gear mechanism P1 plays a role not only in increasing the speed of rotation inputted into the second planetary gear mechanism P2 but also in increasing the speed of rotation inputted into the first motor/generator MG1, thus enabling the weight and the cost to be cut.

If it is assumed that only rotation at an increased speed can be inputted into the second planetary gear mechanism P2 of the transmission T, in order to reduce the increased speed rotation to a required gear ratio, a very large reduction ratio is necessary, and there is a possibility that frictional losses will increase or the transmission T will increase in size, but in accordance with the present embodiment, since it is unnecessary to employ a very large reduction ratio, it becomes possible to reduce frictional losses and reduce the size of the transmission T.

Furthermore, since the second planetary gear mechanism P2, which forms the main speed-changing part of the transmission T, outputs rotation of the second main shaft 14 toward the countershaft 24 side at the same speed when the third clutch C3 is engaged and reduces the speed of rotation of the second main shaft 14 and outputs it toward the countershaft 24 side when the brake B1 is engaged, combining two gear ratios in the first planetary gear mechanism P1 and two gear ratios in the second planetary gear mechanism P2 enables four gear ratios (first speed, second speed, fourth speed, and fifth speed) to be obtained. Moreover, since the second motor/generator MG2 is directly coupled to the second main shaft 14, it becomes possible to carry out travel by means of the driving force of the second motor/generator MG2 without using the driving force of the engine E or to carry out travel while assisting the driving force of the engine E with the driving force of the second motor/generator MG2.

Furthermore, since the first main shaft 13 and the countershaft 24 are disposed in parallel to each other and the main second gear 26, which can be coupled to the first main shaft 13 via the fourth clutch C4, meshes with the counter second gear 27 fixed to the countershaft 24, engaging the fourth clutch C4 enables the third speed gear position to be established without going through the first and second planetary gear mechanisms P1 and P2, and it is thus possible to prevent the occurrence of an event in which gear-shift control becomes unstable when carrying out shift change by changing the gripping of the brake B1 or the clutches C1 to C3 of the first and second planetary gear mechanisms P1 and P2.

Moreover, since the first planetary gear mechanism P1, the first clutch C1, and the second clutch C2 are disposed on the inner peripheral side of the first motor/generator MG1 so as to be contained within the width thereof in the axial direction, it is possible to shorten the dimension in the axial direction and reduce the size of the transmission T. Similarly, since the second planetary gear mechanism P2, the third clutch C3, and the brake B1 are disposed on the inner peripheral side of the second motor/generator MG2 so as to be contained within the width thereof in the axial direction, it is possible to shorten the dimension in the axial direction and reduce the size of the transmission T.

Second Embodiment

A second embodiment of the present invention is explained below by reference to FIG. 9 to FIG. 15. Reference numerals and symbols used in the second embodiment are independent of the reference numerals and symbols used in the first embodiment (see FIG. 1 to FIG. 8), and the same reference numerals and symbols do not necessarily denote corresponding components. Furthermore, reference numerals and symbols are used in common in the second embodiment and a third embodiment (see FIG. 16 to FIG. 20), which is described later, and the same reference numerals and symbols denote corresponding components.

Figure 9:
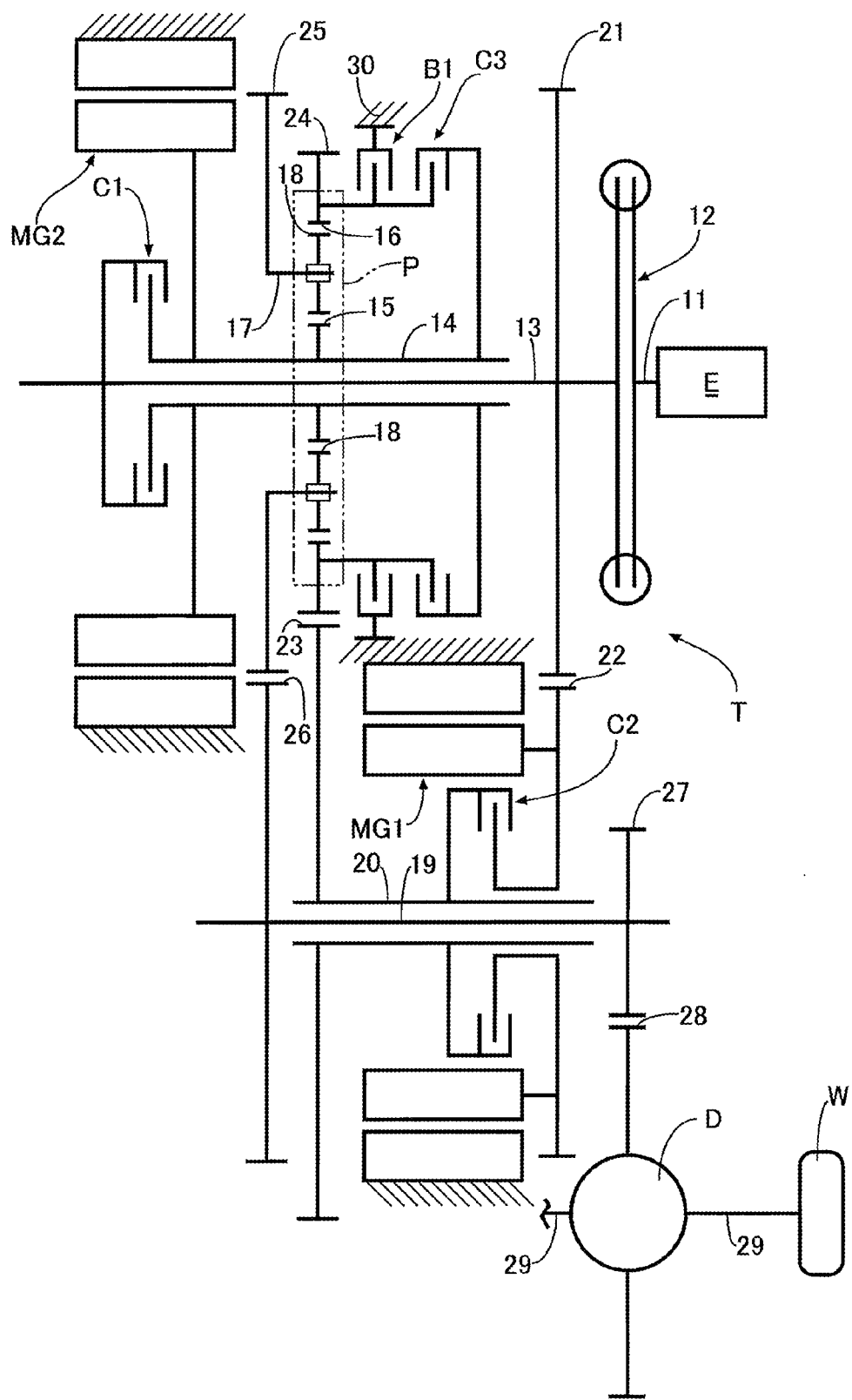
FIG. 9 is a skeleton diagram of a hybrid drive apparatus. (second embodiment)

As shown in FIG. 9, a four speed transmission T of a hybrid vehicle includes a main shaft 13 coaxially connected to a crankshaft 11 of an engine E via a damper 12, and a second intermediate shaft 14 is relatively rotatably fitted around the outer periphery of the main shaft 13. The second intermediate shaft 14 can be coupled to the main shaft 13 via a first clutch C1 and is connected to a rotor of a second motor/generator MG2.

A planetary gear mechanism P for speed change provided on the outer peripheries of the main shaft 13 and the second intermediate shaft 14 includes a sun gear 15, a ring gear 16, a carrier 17, and a plurality of pinions 18 rotatably supported on the carrier 17 and simultaneously meshing with the sun gear 15 and the ring gear 16. The sun gear 15 is fixed to the second intermediate shaft 14, and the ring gear 16 can be coupled to a casing 30 via a brake B1 and can also be coupled to the second intermediate shaft 14 via a third clutch C3.

A first intermediate shaft 20 is relatively rotatably fitted around the outer periphery of a countershaft 19 of the transmission T. A speed-increasing drive gear 21 fixed to the main shaft 13 meshes with a speed-increasing driven gear 22 relatively rotatably supported on the first intermediate shaft 20, a speed-increasing output gear 23 fixed to the first intermediate shaft 20 meshes with a speed-changing input gear 24 formed integrally with the outer periphery of the ring gear 16 of the planetary gear mechanism P, and a first speed-changing output gear 25 fixed to the carrier 17 of the planetary gear mechanism P meshes with a second speed-changing output gear 26 fixed to the countershaft 19. The speed-increasing driven gear 22 is connected to a rotor of a first motor/generator MG1 and can also be coupled to the first intermediate shaft 20 via a second clutch C2.

A final drive gear 27 fixed to the countershaft 19 meshes with a final driven gear 28 fixed to a differential gear D, and left and right driven wheels W and W are connected to drive shafts 29 and 29 extending laterally from the differential gear D.

The speed-increasing driven gear 22 and the speed-increasing output gear 23 are disposed in a divided manner on opposite sides in the axial direction of the first motor/generator MG1, and the second clutch C2 provided on the inner peripheral side of and coaxially with the first motor/generator MG1 is disposed at a position at which it is superimposed in the axial direction with respect to the first motor/generator MG1. Furthermore, the first clutch C1 provided on the inner peripheral side of and coaxially with the second motor/generator MG2 is disposed at a position at which it is superimposed in the axial direction with respect to the second motor/generator MG2.

The operation of the second embodiment of the present invention having the above-mentioned arrangement is now explained.

Figure 14:
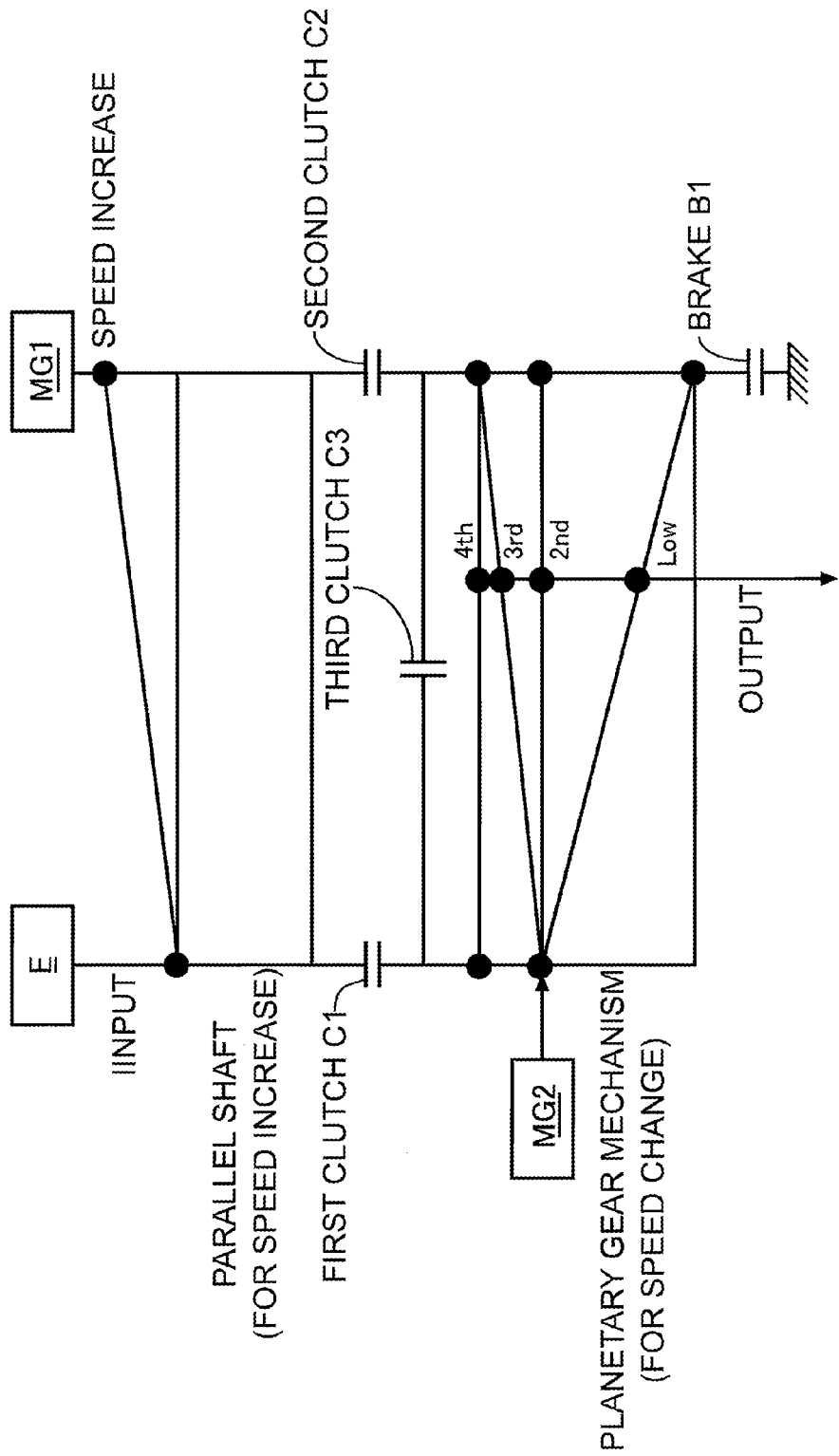
FIG. 14 is a speed diagram of a transmission. (second embodiment)
Figure 16:
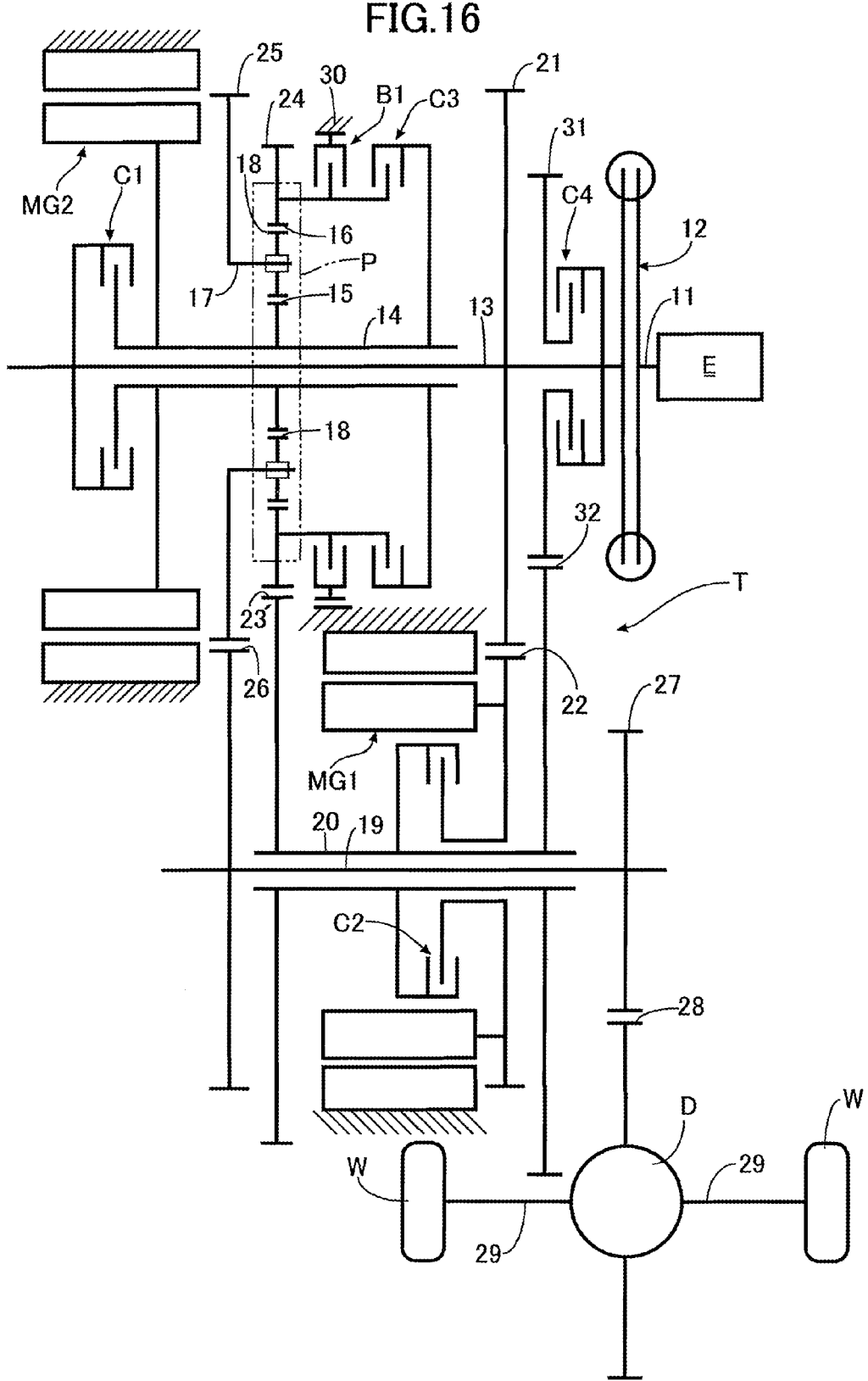
FIG. 16 is a skeleton diagram of a hybrid drive apparatus. (third embodiment)

As is clear from FIG. 9 and FIG. 14, when the first clutch C1 is engaged, since the main shaft 13 is directly coupled to the second intermediate shaft 14, the second intermediate shaft 14 rotates at the same rotational speed as that of the main shaft 13. When the second clutch C2 is engaged, rotation of the main shaft 13 is transmitted to the ring gear 16 of the planetary gear mechanism P via the speed-increasing drive gear 21, the speed-increasing driven gear 22, the second clutch C2, the first intermediate shaft 20, the speed-increasing output gear 23, and the speed-changing input gear 24. In this process, since the number of teeth of the speed-increasing drive gear 21 is larger than the number of teeth of the speed-increasing driven gear 22, rotation of the ring gear 16 is increased in speed relative to rotation of the main shaft 13.

Although it is always necessary to set the gear ratio of the speed-increasing drive gear 21 and the speed-increasing driven gear 22 for a speed increase, the gear ratio of the speed-increasing output gear 23 and the speed-changing input gear 24 may be set for equal speed or for a speed increase or may be set for a speed decrease to a degree that does not offset the speed increase by the speed-increasing drive gear 21 and the speed-increasing driven gear 22.

When the brake B1 is engaged, since the ring gear 16 of the planetary gear mechanism P is fixed to the casing 30, rotation inputted from the second intermediate shaft 14 into the sun gear 15 is decreased in speed and outputted to the carrier 17, that is, the first speed-changing output gear 25. When the third clutch C3 is engaged, the ring gear 16 is coupled to the sun gear 15 via the second intermediate shaft 14, thus putting the planetary gear mechanism P into a locked state, and rotation of the second intermediate shaft 14 is outputted as it is to the carrier 17, that is, the first speed-changing output gear 25.

Therefore, combining engagement and disengagement of the first to third clutches C1 to C3 and the brake B1 enables rotation of the main shaft 13 to be changed in speed at various gear ratios and transmitted to the countershaft 19.

The established state of each of first speed to fourth speed gear positions is specifically explained below by reference to FIG. 10 to FIG. 13.

Figure 10:
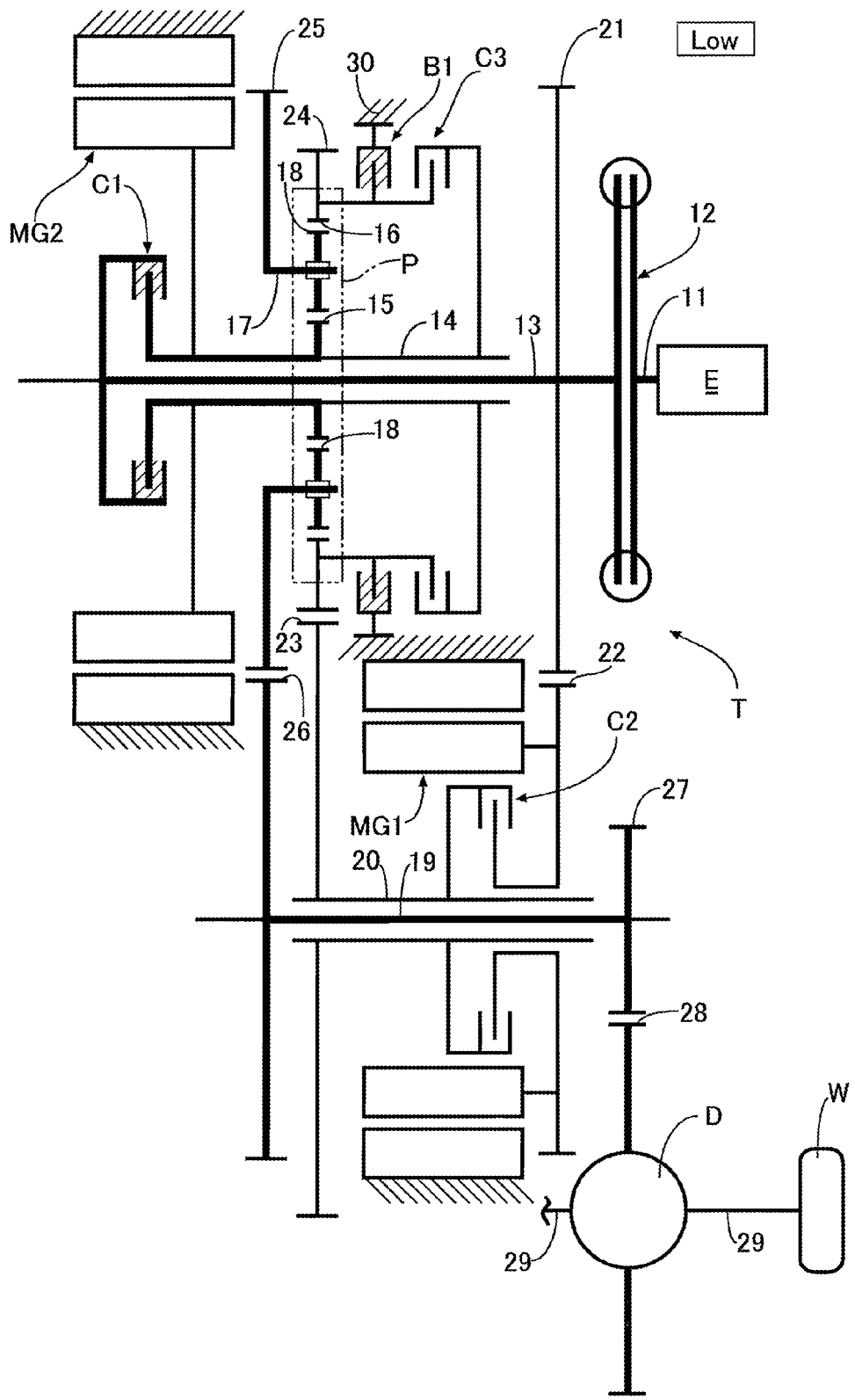
FIG. 10 is a diagram showing a state in which a first speed gear position is established. (second embodiment)

FIG. 10 shows a state in which the first clutch C1 and the brake B1 are engaged and a first speed gear position is established. Rotation of the engine E is transmitted to the driven wheels W and W via the path: crankshaft 11→damper 12→main shaft 13→first clutch C1→second intermediate shaft 14→sun gear 15, pinions 18, and carrier 17 of planetary gear mechanism P→first speed-changing output gear 25→second speed-changing output gear 26→countershaft 19→final drive gear 27→final driven gear 28→differential gear D→drive shafts 29 and 29.

In this process, the planetary gear mechanism P carries out speed reduction, thus establishing the first speed gear position.

Figure 11:
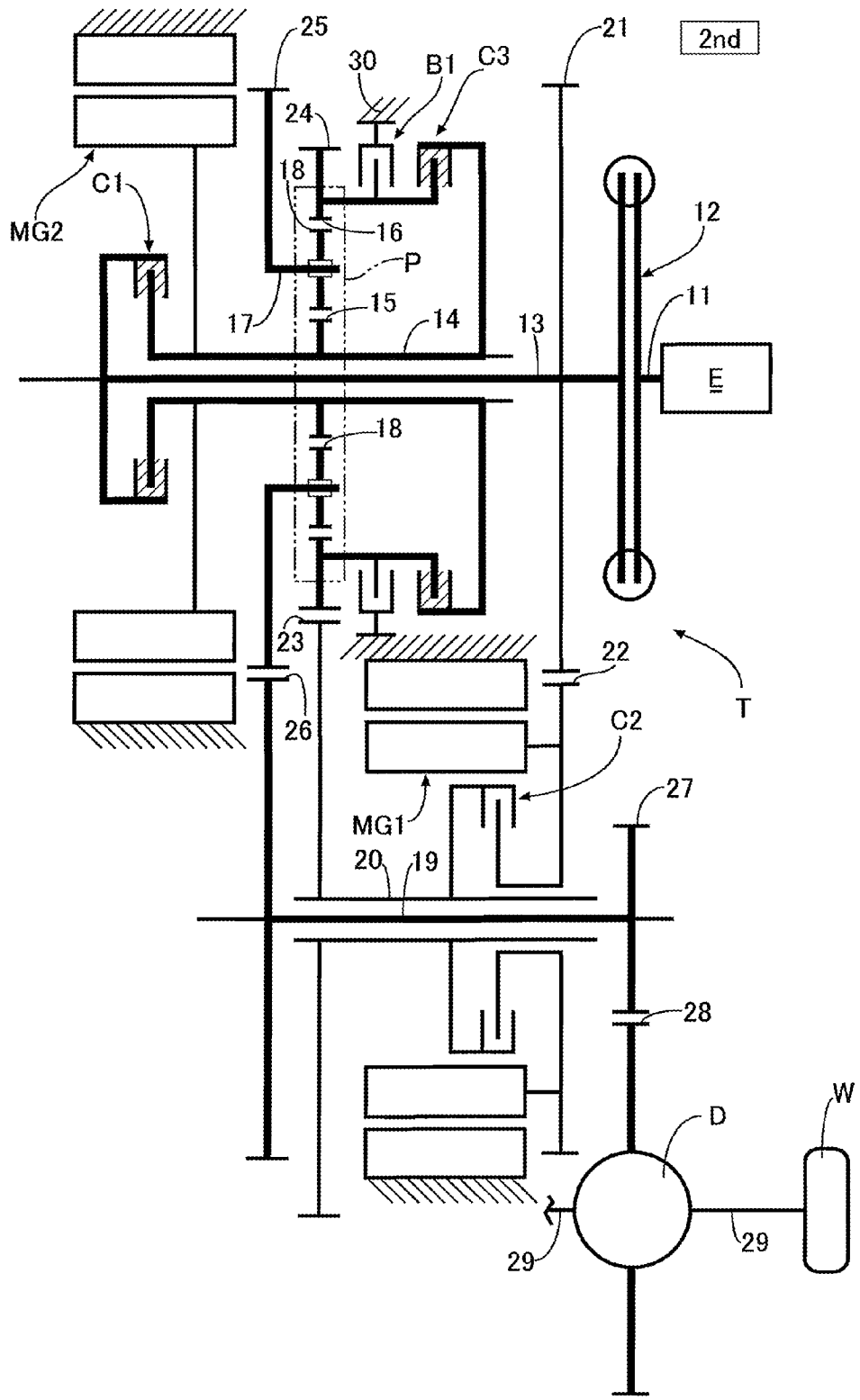
FIG. 11 is a diagram showing a state in which a second speed gear position is established. (second embodiment)

FIG. 11 shows a state in which the first clutch C1 and the third clutch C3 are engaged and a second speed gear position is established. Since the planetary gear mechanism P attains a locked state due to the sun gear 15 and the ring gear 16 being coupled by engagement of the third clutch C3, rotation of the engine E is transmitted to the driven wheels W and W via the path: crankshaft 11→damper 12→main shaft 13→first clutch C1→second intermediate shaft 14→planetary gear mechanism P in locked state→first speed-changing output gear 25→second speed-changing output gear 26→countershaft 19→final drive gear 27→final driven gear 28→differential gear D→drive shafts 29 and 29.

In this process, the planetary gear mechanism P does not carry out speed increase or speed decrease, thus establishing the second speed gear position, which has a smaller gear ratio than that of the first speed gear position.

Figure 12:
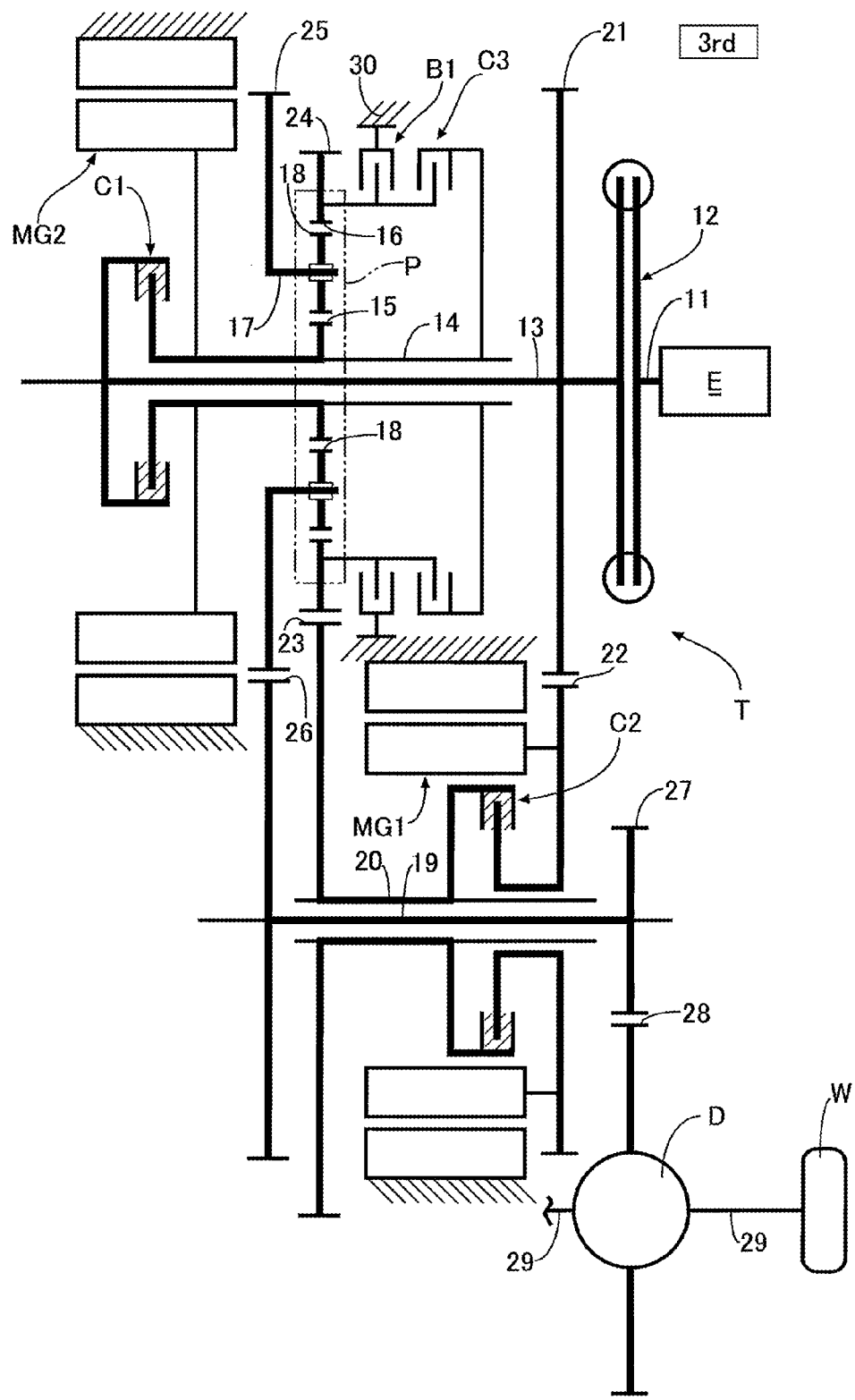
FIG. 12 is a diagram showing a state in which a third speed gear position is established. (second embodiment)

FIG. 12 shows a state in which the first clutch C1 and the second clutch C2 are engaged and a third speed gear position is established. Due to engagement of the second clutch C2, rotation of the main shaft 13 is transmitted to the ring gear 16 of the planetary gear mechanism P via a speed increase path that includes the speed-increasing drive gear 21, the speed-increasing driven gear 22, the second clutch C2, the first intermediate shaft 20, the speed-increasing output gear 23, and the speed-changing input gear 24, rotation of the ring gear 16 is increased in speed relative to rotation of the main shaft 13, and due to engagement of the first clutch C1 the main shaft 13 is directly coupled to the sun gear 15 of the planetary gear mechanism P via the second intermediate shaft 14. As a result, rotation of the engine E is transmitted to the driven wheels W and W via the path: crankshaft 11→damper 12→main shaft 13→first clutch C1→second intermediate shaft 14→sun gear 15, pinions 18, and carrier 17 of planetary gear mechanism P→first speed-changing output gear 25→second speed-changing output gear 26→countershaft 19→final drive gear 27→final driven gear 28→differential gear D→drive shafts 29 and 29.

In this process, the planetary gear mechanism P carries out speed increase, thus establishing the third speed gear position, which has a smaller gear ratio than that of the second speed gear position.

Figure 13:
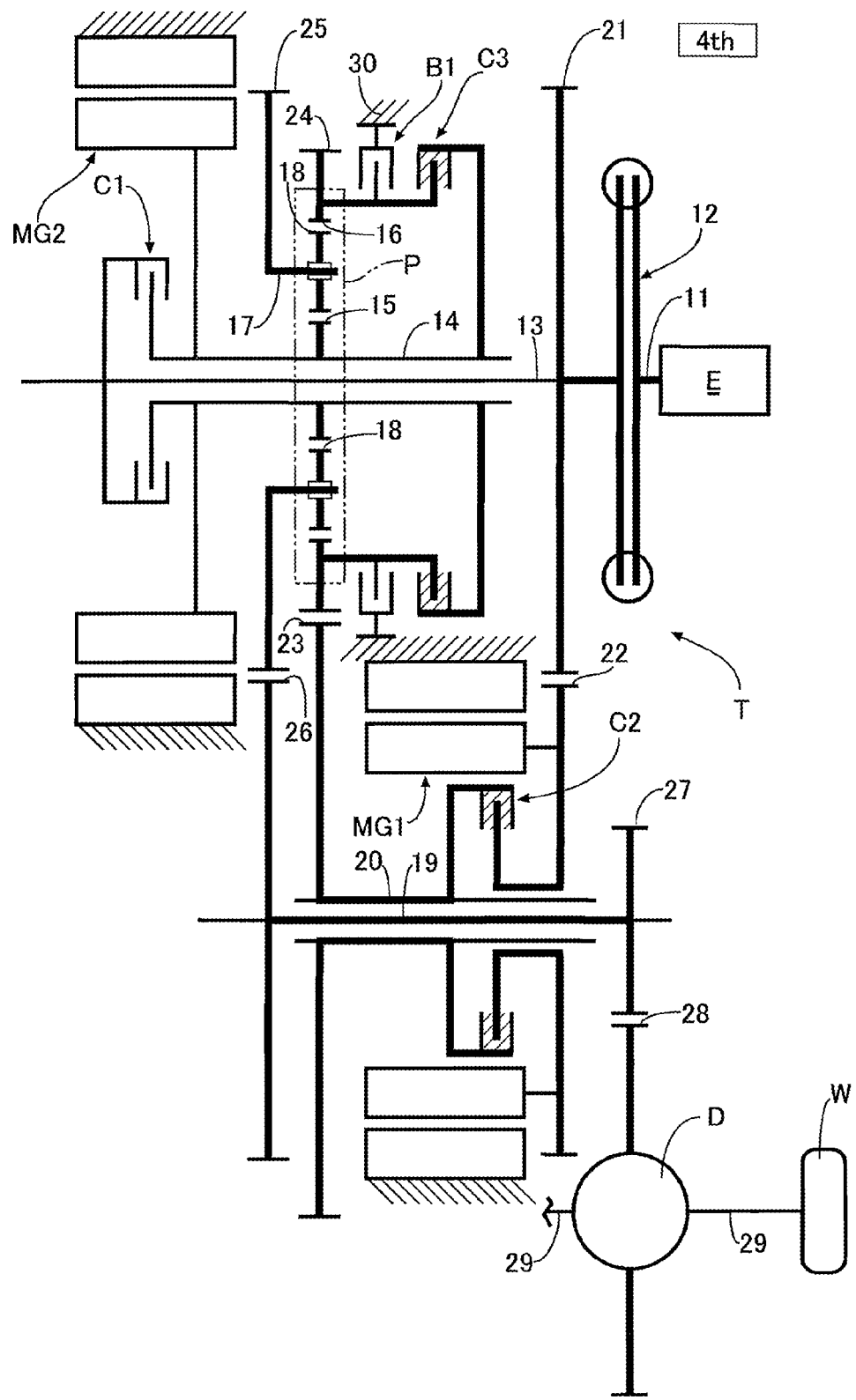
FIG. 13 is a diagram showing a state in which a fourth speed gear position is established. (second embodiment)

FIG. 13 shows a state in which the second clutch C2 and the third clutch C3 are engaged and a fourth speed gear position is established. Since the planetary gear mechanism P attains a locked state due to the sun gear 15 and the ring gear 16 being coupled by engagement of the third clutch C3, rotation of the engine E is transmitted to the driven wheels W and W via the path: crankshaft 11→damper 12→main shaft 13→speed-increasing drive gear 21→speed-increasing driven gear 22→second clutch C2→first intermediate shaft 20→speed-increasing output gear 23→speed-changing input gear 24→planetary gear mechanism P in locked state→first speed-changing output gear 25→second speed-changing output gear 26→countershaft 19→final drive gear 27→final driven gear 28→differential gear D→drive shafts 29 and 29.

In this process, the planetary gear mechanism P does not carry out speed reduction or speed increase, and the speed-increasing drive gear 21 and the speed-increasing driven gear 22 carry out speed increase, thus establishing the fourth speed gear position, which has a smaller gear ratio than that of the third speed gear position.

The operational effect of the second embodiment of the present invention is now explained.

The main shaft 13, the speed-increasing drive gear 21, the speed-increasing driven gear 22, the first intermediate shaft 20, and the speed-increasing output gear 23 form speed-increasing means with parallel shafts, rotation of the main shaft 13 is increased in speed and transmitted to the planetary gear mechanism P, and the power generation efficiency can be enhanced by driving the first motor/generator MG1, which is integral with the speed-increasing driven gear 22 of the speed-increasing means, at an increased rotational speed. In this process, since rotation of the main shaft 13 is increased in speed by the speed-increasing drive gear 21 and the speed-increasing driven gear 22 and transmitted to the first motor/generator MG1, compared with a case in which it is increased in speed by a planetary gear mechanism exclusively used therefor and transmitted to the first motor/generator MG1, it is possible to decrease the number of gears meshing, thus enhancing the transmission efficiency.

In addition, if the first motor/generator MG1 is made to function as a motor, the crankshaft 11 is cranked by the driving force of the first motor/generator MG1, thus starting the engine E. In this process, since rotation of the first motor/generator MG1 is decreased in speed by the speed-increasing driven gear 22 and the speed-increasing drive gear 21 and transmitted to the crankshaft 11 of the engine E, it is possible to crank the crankshaft 11 with a large torque, thus enhancing the ease of starting.

Furthermore, since rotation of the main shaft 13 is inputted into the planetary gear mechanism P for speed change at an equal speed due to engagement of the first clutch C1 and rotation of the main shaft 13 is inputted thereinto at an increased speed via the speed-increasing means due to engagement of the second clutch C2, selectively engaging the first clutch C1 and the second clutch C2 enables a plurality of gear positions to be established. In this process, since the speed-increasing drive gear 21, the speed-increasing driven gear 22, the second clutch C2, the first intermediate shaft 20, and the speed-increasing output gear 23 forming the speed-increasing means for speed change are disposed coaxially with the countershaft 19, the size of the transmission T can be reduced.

Moreover, since the speed-increasing means for speed change is utilized for overdriving the first motor/generator MG1, not only is it possible to reduce the cost, but it is also possible to enhance the power generation efficiency by over-driving the first motor/generator MG1 even if the second clutch C2 is disengaged when an increase in speed is not required for speed change since the second clutch C2 can couple the speed-increasing driven gear 22 to the first intermediate shaft 20.

Furthermore, since two gear positions can be achieved by coupling the ring gear 16 of the planetary gear mechanism P for speed change to the second intermediate shaft 14 via the third clutch C3 or coupling the ring gear 16 to the casing 30 via the brake B1, combining engagement and disengagement of the third clutch C3 and the brake B1 and combining engagement and disengagement of the first clutch C1 and the second clutch C2 enables a total of four gear positions to be established.

In addition, if it is assumed that only rotation at an increased speed can be inputted into the planetary gear mechanism P of the transmission T, in order to reduce the increased speed rotation to a required gear ratio, a very large reduction ratio is necessary, and there is a possibility that transmission efficiency will be degraded or the transmission T will increase in size, but in accordance with the present embodiment, since it is unnecessary to employ a very large reduction ratio, it becomes possible to improve the transmission efficiency and reduce the size of the transmission T.

Moreover, since the second motor/generator MG2 that can be rotated integrally with the second intermediate shaft 14 is provided, it is possible by a simple structure to make a vehicle travel by means of the driving force of the second motor/generator MG2, assist the driving force of the engine E by means of the driving force of the second motor/generator MG2, and recover the kinetic energy of the vehicle as electrical energy by regeneratively braking the second motor/generator MG2.

Furthermore, since the speed-increasing driven gear 22 and the speed-increasing output gear 23 are disposed in a divided manner on opposite sides in the axial direction of the first motor/generator MG1 disposed on the outer peripheral side of the first intermediate shaft 20, and the second clutch C2 is disposed at a position that is coaxial with and on the inner peripheral side of the first motor/generator MG1 and at which it is superimposed thereon in the axial direction, it is possible to shorten the length of the transmission T in the axial direction.

Moreover, since the first clutch C1 is disposed at a position that is coaxial with and on the inner peripheral side of the second motor/generator MG2 and at which it is superimposed thereon in the axial direction, it is possible to shorten the length of the transmission T in the axial direction.

Third Embodiment

A third embodiment of the present invention is now explained by reference to FIG. 16 to FIG. 20.

A transmission T of the third embodiment has six speeds, a second speed gear position and a third speed gear position being newly added to a first speed gear position and a fourth speed gear position to a sixth speed gear position that correspond to the first speed gear position to the fourth speed gear position of the four speed transmission T of the second embodiment. Elements added to the transmission T of the second embodiment in order to establish the second speed gear position and the third speed gear position are a speed-decreasing drive gear 31 rotatably supported on a main shaft 13, a fourth clutch C4 that couples the speed-decreasing drive gear 31 to the main shaft 13, and a speed-decreasing driven gear 32 fixed to a first intermediate shaft 20 and meshing with the speed-decreasing drive gear 31.

Established states of the first speed gear position and the fourth speed gear position to the sixth speed gear position are the same as the established states (see FIG. 10 to FIG. 13) of the first speed gear position to the fourth speed gear position of the second embodiment. Furthermore, the speed-increasing output gear 23 of the second embodiment is changed in name and is called a speed-increasing/speed-decreasing output gear 23' in the third embodiment.

When the fourth clutch C4 is engaged, rotation of the main shaft 13 is transmitted to a ring gear 16 of a planetary gear mechanism P via the fourth clutch C4, the speed-decreasing drive gear 31, the speed-decreasing driven gear 32, the first intermediate shaft 20, the speed-increasing/speed-decreasing output gear 23', and a speed-changing input gear 24. In this process, since the number of teeth of the speed-decreasing drive gear 31 is smaller than the number of teeth of the speed-decreasing driven gear 32, rotation of the ring gear 16 is decreased in speed relative to rotation of the main shaft 13.

That is, when a second clutch C2 is engaged, rotation of the ring gear 16 is amplified relative to rotation of the main shaft 13, but when the fourth clutch C4 is engaged, rotation of the ring gear 16 is decreased in speed relative to rotation of the main shaft 13.

Figure 17:
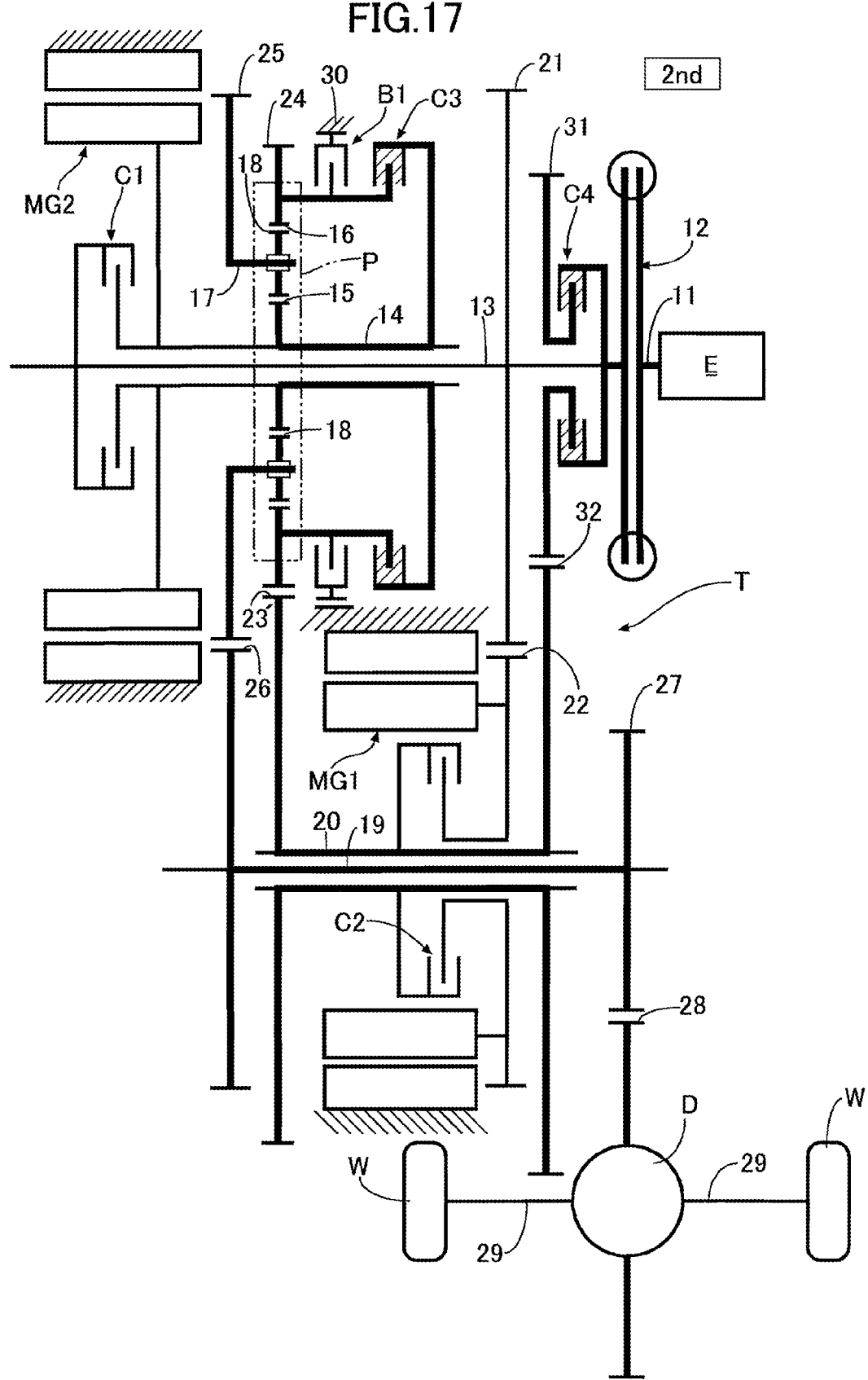
FIG. 17 is a diagram showing a state in which a second speed gear position is established. (third embodiment)

FIG. 17 shows a state in which a third clutch C3 and the fourth clutch C4 are engaged and a second speed gear position is established. Since the planetary gear mechanism P attains a locked state due to a sun gear 15 and the ring gear 16 being coupled by engagement of the third clutch C3, rotation of an engine E is transmitted to driven wheels W and W via the path: crankshaft 11→damper 12→main shaft 13→fourth clutch C4→speed-decreasing drive gear 31→speed-decreasing driven gear 32→first intermediate shaft 20→speed-increasing/speed-decreasing output gear 23'→speed-changing input gear 24→planetary gear mechanism P in locked state→first speed-changing output gear 25→second speed-changing output gear 26→countershaft 19→final drive gear 27→final driven gear 28→differential gear D→drive shafts 29 and 29.

In this process, the planetary gear mechanism P does not carry out speed reduction or speed increase, and the speed-decreasing drive gear 31 and the speed-decreasing driven gear 32 carry out speed reduction, thus establishing the second speed gear position, which has a smaller gear ratio than that of the first speed gear position.

Figure 18:
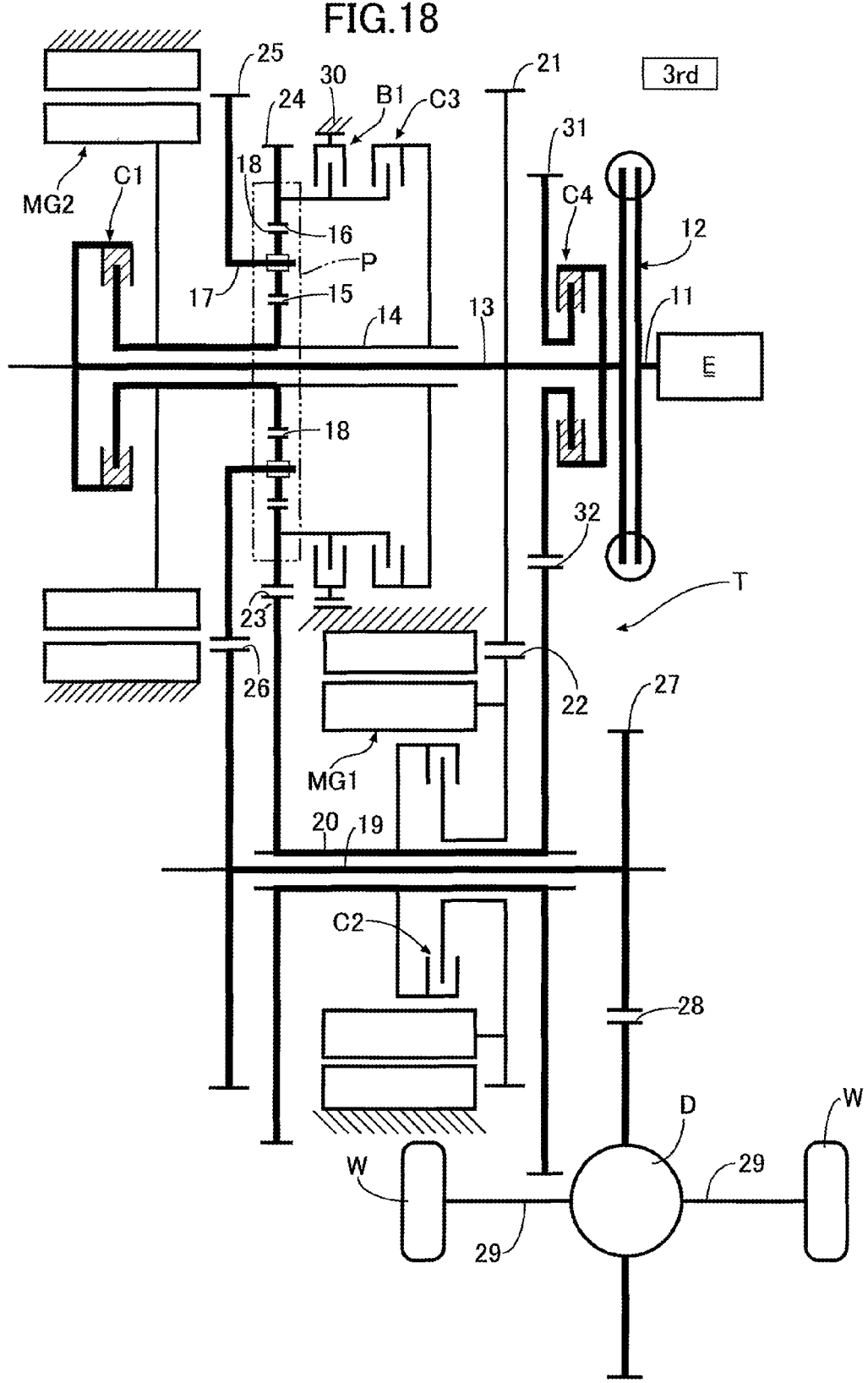
FIG. 18 is a diagram showing a state in which a third speed gear position is established. (third embodiment)
Figure 19:
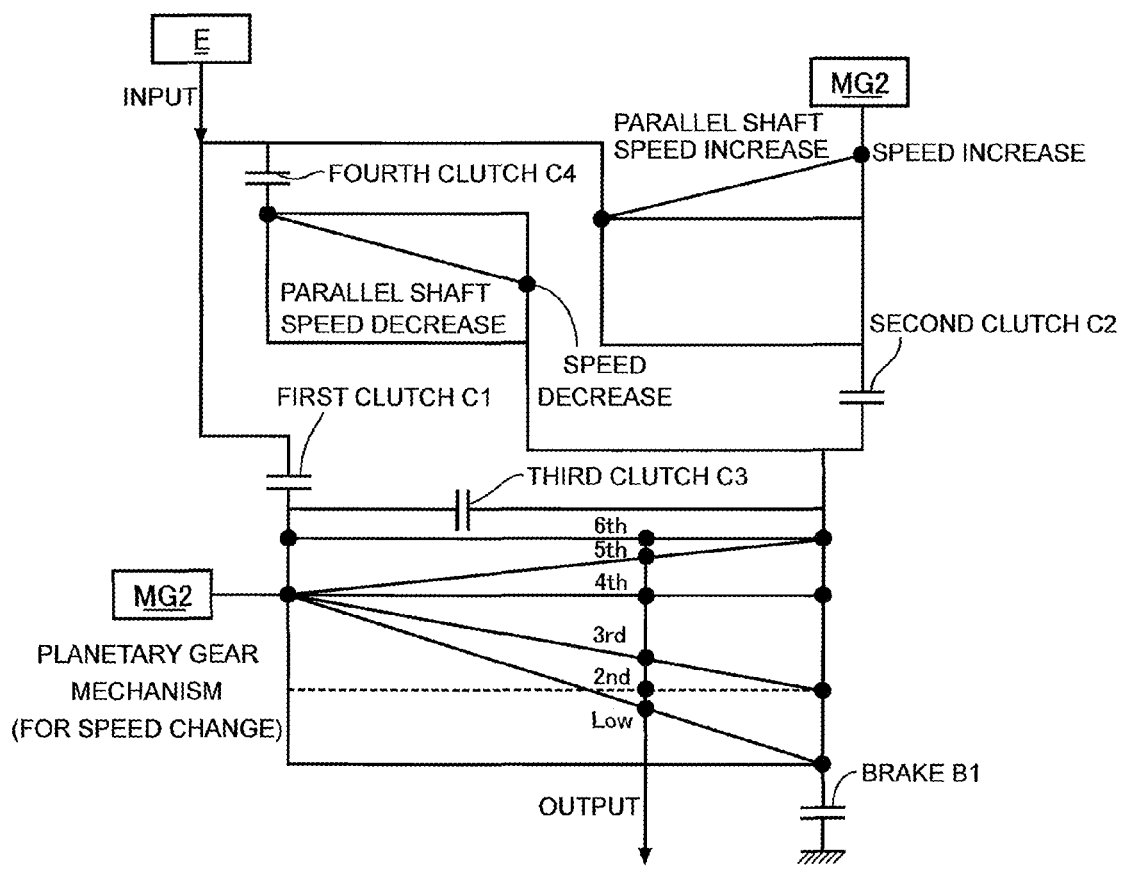
FIG. 19 is a speed diagram of a transmission. (third embodiment)

FIG. 18 shows a state in which a first clutch C1 and the fourth clutch C4 are engaged and a third speed gear position is established. Due to engagement of the fourth clutch C4 rotation of the main shaft 13 is transmitted to the ring gear 16 of the planetary gear mechanism P via a speed decrease path that includes the fourth clutch C4, the speed-decreasing drive gear 31, a speed-decreasing driven gear 32, the first intermediate shaft 20, the speed-increasing/speed-decreasing output gear 23', and the speed-changing input gear 24, and rotation of the ring gear 16 is decreased in speed relative to rotation of the main shaft 13, whereas due to engagement of the first clutch C1 the main shaft 13 is directly coupled to the sun gear 15 of the planetary gear mechanism P via a second intermediate shaft 14. As a result, rotation of the engine E is transmitted to the driven wheels W and W via the path: crankshaft 11→damper 12→main shaft 13→fourth clutch C4→speed-decreasing drive gear 31→speed-decreasing driven gear 32→first intermediate shaft 20→speed-increasing/speed-decreasing output gear 23'→speed-changing input gear 24→planetary gear mechanism P→first speed-changing output gear 25→second speed-changing output gear 26→countershaft 19→final drive gear 27→final driven gear 28→differential gear D→drive shafts 29 and 29.

In this process, the planetary gear mechanism P carries out speed decrease, and the speed-decreasing drive gear 31 and the speed-decreasing driven gear 32 also carry out speed decrease, thus establishing the third speed gear position, which has a smaller gear ratio than that of the second speed gear position.

As hereinbefore described, in accordance with the present embodiment, the same operational effects as those of the second embodiment can be achieved while increasing the number of gear positions of the transmission T from four to six.

Modes for carrying out the present invention are explained above, but the present invention may be modified in a variety of ways as long as the modifications do not depart from the spirit and scope thereof.

For example, in the first embodiment the ring gear 15 of the first planetary gear mechanism P1 is an output element, the sun gear 16 is a fixed element, and the carrier 17 is an input element, but the function of each element may be changed around as appropriate.

Furthermore, in the first embodiment the ring gear 19 of the second planetary gear mechanism P2 is a fixed element, the sun gear 20 is an input element, and the carrier 21 is an output element, but the function of each element may be changed around as appropriate.

Moreover, in the first embodiment, the main second gear 26 can be coupled to the first main shaft 13 via the fourth clutch C4 and the counter second gear 27 is fixed to the countershaft 24, but the main second gear 26 may be fixed to the first main shaft 13 and the counter second gear 27 can be coupled to the countershaft 24 via the fourth clutch C4.

Furthermore, in the second and third embodiments, the sun gear 15 of the planetary gear mechanism P is an input element, the ring gear 16 is a fixed element, and the carrier 17 is an output element, but the function of each element may be changed around as appropriate.

The invention claimed is:

1. A hybrid drive apparatus, comprising;
an engine,
a first motor/generator, and
a transmission,
wherein a first planetary gear mechanism is disposed on a first input shaft of the transmission to which a driving force of the engine is inputted,
a first element of the first planetary gear mechanism being always connected to the first input shaft,
a second element of the first planetary gear mechanism being non-rotatably fixed to a casing,
a third element of the first planetary gear mechanism being connected to the first motor/generator,
the first planetary gear mechanism being capable of increasing the speed of rotation, which is inputted from the first input shaft to the first element and outputting the rotation increased in speed to the third element, engagement of a first clutch provided between the first element and a main speed-changing part of the transmission allowing rotation of the first input shaft to be transmitted to the main speed-changing part at an equal speed, and engagement of a second clutch provided between the third element and the main speed-changing part allowing rotation of the first input shaft to be transmitted to the main speed-changing part at an increased speed,
wherein the main speed-changing part is formed from a second planetary gear mechanism,
wherein a first element of the second planetary gear mechanism is always connected to a second motor/generator and a second input shaft that is relatively rotatably fitted around an outer periphery of the first input shaft,
wherein a second element of the second planetary gear mechanism is capable of being connected to the first element of the second planetary gear mechanism via a third clutch and is also capable of being fixed to the casing via a brake, and
wherein a third element of the second planetary gear mechanism is connected to an output shaft of the transmission.

2. The hybrid drive apparatus according to claim 1, wherein the first input shaft and the output shaft are disposed in parallel to each other, a gear fixed to one of the first input shaft and the output shaft meshes with another gear relatively rotatably supported on the other of the first input shaft and the output shaft, and the another gear is capable of being coupled to said other of the first input shaft and the output shaft via a fourth clutch.

3. The hybrid drive apparatus according to claim 1, wherein the first clutch and the second clutch are disposed at positions that are coaxial with and on an inner peripheral side of the first motor/generator and at which the first and second clutches are superimposed thereon in an axial direction of the first motor/generator, and the third clutch and the brake are disposed at positions that are coaxial with and on an inner peripheral side of the second motor/generator and at which the third clutch and the brake are superimposed thereon in an axial direction of the second motor/generator.

4. The hybrid drive apparatus according to claim 1, wherein the first planetary gear mechanism is disposed at a position that is coaxial with and on an inner peripheral side of the first motor/generator and at which the first planetary gear mechanism is superimposed thereon in an axial direction of the first motor/generator, and the second planetary gear mechanism is disposed at a position that is coaxial with and on an inner peripheral side of the second motor/generator and at which the second planetary gear mechanism is superimposed thereon in an axial direction of the second motor/generator.

5. The hybrid drive apparatus according to claim 2, wherein the first clutch and the second clutch are disposed at positions that are coaxial with and on an inner peripheral side of the first motor/generator and at which the first and second clutches are superimposed thereon in an axial direction of the first motor/generator, and the third clutch and the brake are disposed at positions that are coaxial with and on an inner peripheral side of the second motor/generator and at which the third clutch and the brake are superimposed thereon in an axial direction of the second motor/generator.

* * * * *